(12) United States Patent
Harvey et al.

(10) Patent No.: US 7,194,447 B2
(45) Date of Patent: Mar. 20, 2007

(54) SYSTEM AND METHOD FOR PROCESSING WELDING DATA

(75) Inventors: Darryl G. Harvey, Woodstock (CA); Peter J. Cortina, Cambridge (CA)

(73) Assignee: Illinois Tool Works Inc., Glenview, IL (US)

( * ) Notice: Subject to any disclaimer, the term of this patent is extended or adjusted under 35 U.S.C. 154(b) by 493 days.

(21) Appl. No.: 10/731,215

(22) Filed: Dec. 9, 2003

(65) Prior Publication Data

US 2005/0125084 A1    Jun. 9, 2005

(51) Int. Cl.
*G06N 5/00* (2006.01)
(52) U.S. Cl. .................. 706/45; 706/21; 706/23; 700/49; 700/51; 700/52; 700/53; 700/91
(58) Field of Classification Search .......... 706/19, 706/21, 45, 48, 903, 904, 906, 912, 914, 706/925; 228/101, 102, 120, 121, 122.1, 228/125, 132, 133, 148, 141.1, 8, 11, 33, 228/56.3; 700/9, 13–19, 28–37, 49–52, 67, 700/90–92; 703/1–4, 7, 13, 17, 18, 20, 23
See application file for complete search history.

(56) References Cited

U.S. PATENT DOCUMENTS

| 5,233,150 | A | * | 8/1993 | Schneebeli et al. | ...... 219/76.14 |
| 6,051,805 | A | * | 4/2000 | Vaidya et al. | .......... 219/130.01 |
| 6,292,715 | B1 | * | 9/2001 | Rongo | ........................ 700/249 |
| 6,636,776 | B1 | * | 10/2003 | Barton et al. | ................ 700/169 |

* cited by examiner

*Primary Examiner*—Joseph P Hirl
(74) *Attorney, Agent, or Firm*—Fletcher Yoder

(57) ABSTRACT

A system and method for evaluating the use of a welding process for welding a weld joint. The method comprises providing a user with requests for data to enable a processor-based system to establish various attributes of welding a specific weld joint using a specific welding process. The various attributes may include the cost of welding the weld joint using the welding process. The various attributes may include the cycle time for welding the weld joint using the welding process. The system comprises a program operable to direct the processor-based system to request data from a user and to process the requested data received from the user to enable a processor-based system to establish various attributes of welding a specific weld joint using a specific welding process.

37 Claims, 20 Drawing Sheets

| Combo | Process | Dia (Imp) | Dia (met) | WFS (Imp) | WFS (met) | ESO (Imp) | ESO (met) | Amps | Shield Gas |
|---|---|---|---|---|---|---|---|---|---|
| FCAWAr / 25%CO20.0453500.5 | FCAW | 0.045 | 1.2 | 350 | 8.9 | 0.50 | 12.7 | 220 | Ar / 25% CO2 |
| FCAWAr / 25%CO20.0453750.5 | FCAW | 0.045 | 1.2 | 375 | 9.5 | 0.50 | 12.7 | 230 | Ar / 25% CO2 |
| FCAWAr / 25%CO20.0454000.5 | FCAW | 0.045 | 1.2 | 400 | 10.2 | 0.50 | 12.7 | 240 | Ar / 25% CO2 |
| FCAWAr / 25%CO20.0454250.5 | FCAW | 0.045 | 1.2 | 425 | 10.8 | 0.50 | 12.7 | 250 | Ar / 25% CO2 |
| FCAWAr / 25%CO20.0454500.5 | FCAW | 0.045 | 1.2 | 450 | 11.4 | 0.50 | 12.7 | 260 | Ar / 25% CO2 |
| FCAWAr / 25%CO20.0454750.5 | FCAW | 0.045 | 1.2 | 475 | 12.1 | 0.50 | 12.7 | 270 | Ar / 25% CO2 |
| FCAWAr / 25%CO20.0455000.5 | FCAW | 0.045 | 1.2 | 500 | 12.7 | 0.50 | 12.7 | 280 | Ar / 25% CO2 |
| FCAWAr / 25%CO20.0455250.5 | FCAW | 0.045 | 1.2 | 525 | 13.3 | 0.50 | 12.7 | 290 | Ar / 25% CO2 |
| FCAWAr / 25%CO20.0455500.5 | FCAW | 0.045 | 1.2 | 550 | 14.0 | 0.50 | 12.7 | 300 | Ar / 25% CO2 |
| FCAWAr / 25%CO20.0453500.75 | FCAW | 0.045 | 1.2 | 350 | 8.9 | 0.75 | 19.1 | 200 | Ar / 25% CO2 |

FIG. 9

| Note: Ensure consumable name matches tab A consumable name. | | | | | Recommended Parameters - Imperial | | | Recommended Parameters - Metric | | |
|---|---|---|---|---|---|---|---|---|---|---|
| Combo | Consumable Name | Diameter (Imp) | Diameter (Metric) | Voltage | WFS | ESO | WFS | ESO | Current |
| Hobart Fabcor 96Ar / 15% CO20.045 | Hobart Fabcor 96 | 0.045 | 1.2 | 26.0 | 575 | 0.50 | 14.6 | 12.7 | 300 |
| Hobart Fabcor 96Ar / 15% CO20.052 | Hobart Fabcor 96 | 0.052 | 1.4 | 27.5 | 400 | 0.75 | 10.2 | 19.1 | 320 |
| Hobart Fabcor 96Ar / 15% CO20.062 | Hobart Fabcor 96 | 0.062 | 1.6 | 28.0 | 325 | 0.75 | 8.3 | 19.1 | 400 |
| Hobart XL-71Ar / 25%CO20.045 | Hobart XL-71 | 0.045 | 1.2 | 27.5 | 525 | 0.50 | 13.3 | 12.7 | 290 |
| Hobart XL-71Ar / 25%CO20.052 | Hobart XL-71 | 0.052 | 1.4 | 25.5 | 450 | 0.75 | 11.4 | 19.1 | 305 |
| Hobart XL-71Ar / 25%CO20.062 | Hobart XL-71 | 0.062 | 1.6 | 27.0 | 275 | 0.75 | 7.0 | 19.1 | 375 |
| Hobart FabDual T91MAr / 25%CO20.045 | Hobart FabDual T91M | 0.045 | 1.2 | 25.0 | 450 | 0.50 | 11.4 | 12.7 | 275 |
| Hobart FabDual T91MAr / 25%CO20.052 | Hobart FabDual T91M | 0.052 | 1.4 | 26.0 | 350 | 0.63 | 8.9 | 16.0 | 325 |
| Hobart FabDual T91MAr / 25%CO20.062 | Hobart FabDual T91M | 0.062 | 1.6 | 27.0 | 275 | 0.75 | 7.0 | 19.1 | 375 |
| Hobart RXR100% CO20.062 | Hobart RXR | 0.062 | 1.6 | 28.0 | 275 | 0.75 | 7.0 | 19.1 | 375 |
| Hobart RXR100% CO20.078 | Hobart RXR | 0.078 | 2.0 | 29.0 | 250 | 1.00 | 6.4 | 25.4 | 425 |
| Hobart RXR100% CO20.094 | Hobart RXR | 0.094 | 2.4 | 30.0 | 200 | 1.00 | 5.1 | 25.4 | 475 |
| Eclipse RXR-XLS100% CO20.062 | Eclipse RXR-XLS | 0.062 | 1.6 | 28.0 | 275 | 0.75 | 7.0 | 19.1 | 375 |
| Eclipse RXR-XLS100% CO20.078 | Eclipse RXR-XLS | 0.078 | 2.0 | 29.0 | 250 | 1.00 | 6.4 | 25.4 | 425 |
| Eclipse RXR-XLS100% CO20.094 | Eclipse RXR-XLS | 0.094 | 2.4 | 30.0 | 200 | 1.00 | 5.1 | 25.4 | 475 |
| Hobart FabDual T9M100% CO20.062 | Hobart FabDual T9M | 0.062 | 1.6 | 28.0 | 275 | 0.75 | 7.0 | 19.1 | 375 |
| Hobart FabDual T9M100% CO20.078 | Hobart FabDual T9M | 0.078 | 2.0 | 29.0 | 250 | 1.00 | 6.4 | 25.4 | 425 |
| Hobart FabDual T9M100% CO20.094 | Hobart FabDual T9M | 0.094 | 2.4 | 30.0 | 200 | 1.00 | 5.1 | 25.4 | 475 |
| BR-6Ar / 8-10% CO20.052 | BR-6 | 0.052 | 1.4 | 28.0 | 425 | 0.50 | 10.8 | 12.7 | 290 |

Key Account Management (KAM) Summary Report ~284

Executive Summary
We have performed a process analysis of the following weldment :
  Description : TANK END WELDS AND SEAM
PQR # / Procedure # : test

We have determined that a number of cost and quality drivers should be evaluated
  - *Total metal deposited* : to evaluate any overweld / underweld conditions
  - *Total cycle time ( including pre-weld, post-weld, and welding time )* : to evaluate plant capacity increase potential
  - *Heat input analysis* : to determine if distortion reduction potential is possible
  - *Total process cost* : to determine if a new process will reduce to the total process cost Our analysis highlights the following opportunities for improvement :

Total Metal Deposited
Our analysis indicates that the net difference of total metal deposited between the current procedure and the new procedure is approximately : 0 lbs [0 %] ~286
  * *The new procedure is producing a weld deposit which matches that required by the joint dimensions*
  ** *The original procedure is producing a weld deposit which matches that required by the joint dimensions*

Total Cycle Time
Our analysis indicates the potential capacity that may be available by converting to the new process will be approximately : 2.64 hrs [54.5 %] per weld joint ~288
  * *The new procedure provides the opportunity to increase throughput*

Heat Input Analysis
Our analysis indicates that the total heat input difference between the current process and the new process is approximately : 5.74 kJ/in [30 %] ~290
  * *The new procedure provides the opportunity to reduce overall heat input ( reduce distortion )*

Total Process Cost
Our analysis indicates that the total process cost difference between the current process and the new process is approximately : $ 162.5 [54.1 %] per weld joint ~292
The new procedure provides significant reductions (greater than 10%) in the following areas :

WELD JOINT DETAIL REPORT — 294

GENERAL INFORMATION

JOINT TYPE   FILLET-FLAT
CROSS SECTION AREA (CSA)   0.021 in² — 298
TOTAL LENTH OF WELD JOINT   33ft

WELD JOINT GRAPHIC DETAIL

LEG LENGTH (A)   0.187 in
LEG LENGTH (B)   0.187 in

THEORETICAL EFFECTIVE
THROAT (t)   0.132 in — 298

Welding Procedure Detail Report

300 →

General Information
- Description: TANK END WELDS AND SEAM
- PQR # / Procedure #: test
- Total length of weld joint: 33 ft
- Labor & Overhead Rate: 60 $/hr
- Power Rate: 0.08 $/kWh
- Power Supply Efficiency: 75 %

Welding Procedure Detail

Current Procedure

Total # of Weld Passes: 1 — 72

| | Process 1 | | | |
|---|---|---|---|---|

Procedure Variables Information

| | Process 1 | | | |
|---|---|---|---|---|
| Number of Weld Passes | 1 | | | |
| Welding Process | MCAW-Manual | | | |
| Operating Factor [ % ] | 30 | | | |
| Electrode Brand Name | Custom - MCAW | | | |
| Electrode Classification | CSA E4801C-6-CH | | | |
| Type of Shielding Gas | Ar / 8-10% $CO_2$ | | | |
| Gas Flow Rate [ cfh ] | 40 | | | |
| Deposition Efficiency [ % ] | 91 | | | |
| Electrode Diameter [ in ] | 0.045 | | | |
| Welding Voltage [ volts ] | 28.0 | | | |
| Wire Feed Speed [ in/min ] | 300 | | | |
| Electrode Stick-out [ in ] | 0.50  302 | | | |
| Welding Current [ amps ] | 195 | | | |
| Welding Travel Speed [ in/min ] | 18.88 | | | |

— 104

| | | | | |
|---|---|---|---|---|
| Theoretical Deposition Rate [ lbs/hr ] | 7.45 | | | |
| Actual Deposition Rate [ lbs/hr ] | 2.03 | | | |

Consumable Cost Information

| | | | | |
|---|---|---|---|---|
| Electrode Cost [ $/lbs ] | 2.00 | | | |
| Shielding Gas Cost [ $/ft3 ] | 0.10 | | | |

Additional Information

| | | | |
|---|---|---|---|
| Pre-weld Time [ hrs ] | 2.08 | —110 | Description  see IP TAB |
| Post-weld Time [ hrs ] | 1.60 | | Description  see IP TAB |
| Additional Variable Costs [ $ ] | 3.00 | | Description  grinding disks, spatter spray |

New Procedure

Total # of Weld Passes: 1 — 120

| | Process 1 | | | |
|---|---|---|---|---|

Procedure Variables Information

| | Process 1 | | | |
|---|---|---|---|---|
| Number of Weld Passes | 1 | | | |
| Welding Process | MCAW-Manual | | | |
| Operating Factor [ % ] | 30 | | | |
| Electrode Brand Name | Corex 6XC | | | |
| Electrode Classification | CSA E4801C-6-CH | | | |
| Type of Shielding Gas | Ar / 2-5% $O_2$ | | | |
| Gas Flow Rate [ cfh ] | 40 | | | |
| Deposition Efficiency [ % ] | 97 | | | |
| Electrode Diameter [ in ] | 0.052 | | | |
| Welding Voltage [ volts ] | 26.0 | | | |
| Wire Feed Speed [ in/min ] | 450 | | | |
| Electrode Stick-out [ in ] | 0.75  304 | | | |
| Welding Current [ amps ] | 300 | | | |
| Welding Travel Speed [ in/min ] | 40.31 | | | |

| | | | | |
|---|---|---|---|---|
| Theoretical Deposition Rate [ lbs/hr ] | 14.93 | | | |
| Actual Deposition Rate [ lbs/hr ] | 4.34 | | | |

Consumable Cost Information — 152

| | | | | |
|---|---|---|---|---|
| Electrode Cost [ $/lbs ] | 2.00 | | | |
| Shielding Gas Cost [ $/ft3 ] | 0.10 | | | |

Additional Information

| | | | |
|---|---|---|---|
| Pre-weld Time [ hrs ] | 1.66 | —158 | Description  see IP TAB |
| Post-weld Time [ hrs ] | | | Description  see IP TAB |
| Additional Variable Costs [ $ ] | | | Description  see IP TAB |

Note : Numbers shown on this report are estimates only, any changes will modify the results

FIG. 14

Weld Procedure Summary 306

Customer

Weld Metal Deposition Summary

Joint Information

Joint Type: Fillet - Flat
Total length of weld joint: 33 ft
Cross Section Area (CSA) 0.021 in2

Current Procedure

| | Total |
|---|---|
| Weld Metal Deposited [lbs] | 2.37 |
| Weld Metal Required by Weld Joint [lbs] | 2.37 |
| Overweld (Underweld) | 0.0% |

Cycle Time

| | Total |
|---|---|
| Pre-weld Time [hrs] | 2.08 |
| Post-weld Time [hrs] | 1.60 |
| Total Welding Time [hrs] | 1.17 |
| Cycle Time [hrs] | 4.85 |

Heat Input Summary

| | Total |
|---|---|
| Heat Input [kJ/in] | 17.4 |

Weld Consumable Usage Summary

| | Total |
|---|---|
| Electrode Consumed [lbs] | 2.61 |
| Shielding Gas Consumed [ft3] | 13.98 |
| Power Consumed [kWh] | 2.54 |

Procedure Cost

| | Total |
|---|---|
| Pre & Post Weld Labor [$] | 220.80 |
| Welding Labor [$] | 69.92 |
| Total Electrode [$] | 5.21 |
| Total Shielding Gas [$] | 1.40 |
| Power [$] | 0.20 |
| Additional Variable Expense(s) [$] | 3.00 |
| Procedure / Process Total Cost | $300.53 |

New Procedure

| | Total | |
|---|---|---|
| Weld Metal Deposited [lbs] | 2.37 | 322 |
| Weld Metal Required by Weld Joint [lbs] | 2.37 | 324 |
| Overweld (Underweld) | 0.0% | |

Cycle Time

| | Total | |
|---|---|---|
| Pre-weld Time [hrs] | 1.66 | |
| Post-weld Time [hrs] | | |
| Total Welding Time [hrs] | 0.55 | |
| Cycle Time [hrs] | 2.21 | 326 |

Heat Input Summary

| | Total | |
|---|---|---|
| Heat Input [kJ/in] | 11.6 | 328 |

Weld Consumable Usage Summary

| | Total | |
|---|---|---|
| Electrode Consumed [lbs] | 2.44 | |
| Shielding Gas Consumed [ft3] | 6.55 | |
| Power Consumed [kWh] | 1.70 | 330 |

Procedure Cost

| | Total | |
|---|---|---|
| Pre & Post Weld Labor [$] | 99.60 | |
| Welding Labor [$] | 32.75 | |
| Total Electrode [$] | 4.89 | |
| Total Shielding Gas [$] | 0.65 | |
| Power [$] | 0.14 | |
| Additional Variable Expense(s) [$] | | |
| Procedure / Process Total Cost | $138.03 | 332 |

Note : Numbers shown on this report are estimates only, any changes will modify the results

Customer

Welding Procedure Comparison Summary

Procedure Summary

Description TANK END WELDS AND SEAM
PQR # / Procedure # test
Joint Type Fillet - Flat
Weld Metal Required by Weld Joint 2.37 lbs Cross Section Area (CSA) 0.021 in2
Total length of weld joint 33 ft  ← 336, 338

|  | per weld joint | | | per 100 lbs deposited metal | |
|---|---|---|---|---|---|
|  | Current Procedure | New Procedure | | Current Procedure | New Procedure |
| Deposition | | | | Not Applicable | |
| Weld Metal Deposited | 2.37 | 2.37 | lbs | Weld Deposit Difference Exceeds 10% | |
| Overweld (Underweld) | 0.01% | 0.00% | | | |
| Cycle Time | | | | | |
| Pre-weld Time | 2.08 | 1.66 | hrs | | hrs |
| Post-weld Time | 1.60 | | hrs | | hrs |
| Total Welding Time | 1.17 | 0.55 | hrs | | hrs |
| Cycle Time | 4.85 | 2.21 | hrs | | hrs |

Potential Capacity Increase    2.64 hrs    54.5 %    ← 288

| Consumption Summary | | | | | |
|---|---|---|---|---|---|
| Electrode Consumed | 2.61 | 2.44 | lbs | | lbs |
| Shielding Gas Consumed | 13.98 | 6.55 | ft3 | | ft3 |
| Power Consumed | 2.54 | 1.70 | kWh | | kWh |

Heat Input Summary    17.35    11.61    kJ/in

Welding Cost Analysis Summary

|  | per weld joint | | per 100 lbs deposited metal | |
|---|---|---|---|---|
| Total Cost Summary | Current Procedure | New Procedure | Current Procedure | New Procedure |
| Pre & Post Weld Labor | $ 220.80 | $ 99.60 | $ | $ |
| Welding Labor | 69.92 | 32.75 | | |
| Total Labor | $ 290.72 | $ 132.35 | $ | $ |
| Total Electrode | 5.21 | 4.89 | | |
| Total Shielding Gas | 1.40 | 0.65 | | |
| Power | 0.20 | 0.14 | | |
| Additional Variable Expense(s) | 3.00 | | | |
| Total Process Cost | $ 300.53 | $ 138.03 | $ | $ |

Potential Production Cost Savings    $ 162.50    54.1 %    ← 292

Note : Numbers shown on this report are estimates only, any changes will modify the results

Improvement Potential Checklist

Pre-Weld Activities

| | Activity Name | Current (min) | IP % | Potential (min) | Description |
|---|---|---|---|---|---|
| 1 | Plate Cutting and roll forming | 60.0 | 0 | 60.0 | currently stack cutting plates and opportunity |
| 2 | Part Movement | 10.0 | 0 | 10.0 | Remove tank from rolls and send to fit and tack area. Opportunity to eliminate this while space by tacking part in rollers once formed. |
| 3 | Fit/Tack | 35.0 | 50 | 17.5 | draw tank back together with belts and tack seams once aligned and tack end cones on. Opportunity is to tack once the seams come together in the rolls. This is a redundant |
| 4 | Fixturing | 10.0 | 0 | 10.0 | put tank on rolls and align tank for welding. |
| 5 | Anti-Spatter Application | 10.0 | 100 | 0.0 | Apply anti spatter over complete tank. This is 12 gauge material and spatter sticks well with current process and has to all be removed |
| 6 | 0 | 0.0 | | 0.0 | 0 |
| 7 | 0 | 0.0 | | 0.0 | |
| 8 | 0 | 0.0 | | 0.0 | |
| 9 | 0 | 0.0 | | 0.0 | |
| 10 | 0 | 0.0 | | 0.0 | |

Weld Activities

| | Activity Name | Current (min) | IP % | Potential (min) | Description |
|---|---|---|---|---|---|
| | Arc-On | 30.0 | 0 | 18.2 | actual arc on time is 11 min for each end and 8 min for the seam. Opportunity is to increase weld deposition and also reduce heat input |
| | Arc-Off | 40.0 | 90 | 4.0 | 20 min essential for welder to rest every 3.5 min of weldin, tank ends are done in thirds. 20 min non essential for welder to repaire blow throughs which average 2 per end on |

Post-Weld Activities

| | Activity Name | Current (min) | IP % | Potential (min) | Description |
|---|---|---|---|---|---|
| 1 | Grinding / Buffing | 25.0 | 100 | 0.0 | removal of all spatter Opportunity = eliminate spatter |
| 2 | Repair / Re-work | 15.0 | 100 | 0.0 | repair blow holes and blend stop and starts. Opportunity = reduce heat input |
| 3 | 0 | 0.0 | | 0.0 | 0 |
| 4 | 0 | 0.0 | | 0.0 | 0 |
| 5 | 0 | 0.0 | | 0.0 | 0 |
| 6 | 0 | 0.0 | | 0.0 | 0 |
| 7 | 0 | 0.0 | | 0.0 | 0 |
| 8 | 0 | 0.0 | | 0.0 | 0 |
| 9 | 0 | 0.0 | | 0.0 | 0 |
| 10 | 0 | 0.0 | | 0.0 | 0 |

Total: 235.0 | 119.7 | Overall cycle time improvement potential of 49.1 %

FIG. 20

SYSTEM AND METHOD FOR PROCESSING WELDING DATA

BACKGROUND OF THE INVENTION

The present invention relates generally to the field of welding, and more particularly to the field of processing data to evaluate welding processes.

Arc welding may be used to manufacture many products. Typically, a metal electrode is placed on or near the work piece to complete an electric circuit and enable electric current to flow through the electrode and work piece. The electric current produces localized melting in the work piece, and in some welding processes it may cause the electrode to melt. When the electric current is removed, the work piece cools and solidifies, forming a weld. Typically, the electricity for the arc welding process is provided by a power source through a welding cable coupled to a welding torch. Typically, the power source is a constant voltage AC, DC, or a combination AC/DC source.

There are many types of arc welding processes. For example, GMAW (Gas Metal Arc Welding), commonly referred to as MIG (Metal Inert Gas) welding, is one type of arc welding process. In GMAW, typically an inert gas is used to shield a wire electrode. The inert gas forms a barrier to prevent impurities in the atmosphere from entering the weld puddle, preventing oxidation of the weld. The electrode wire serves as a filler metal for the weld. Another type of welding is FCAW (Flux Cored Arc Welding). FCAW is a similar process to GMAW but uses a different type of electrode wire to serve as the filler metal for the weld. The FCAW may or may not be used with a shielding gas. SAW (Submerged Arc Welding) is yet another type of welding process. In SAW a powdered flux typically is used, rather than a gas, to shield the weld puddle.

Many factors affect the optimal welding process for a particular welding application. For example, the welding application itself may exclude the use of certain welding processes. In addition, many factors may affect the optimal consumables, e.g. shield gas and electrode, to use for a specific welding application. In addition, the cost of using a particular process for the application may affect the selection of the welding process to be used. In turn, many factors affect the cost of using a particular welding process. For example, the cost of the electrodes, the cost of the shield gas, the time to complete the application using a particular procedure, and the energy required to perform the application may affect the cost of utilizing a particular welding application.

Identifying the most desirable welding process and/or consumable to use for a specific welding application typically is a matter of judgment. A need exists for a tool that will enable a user to analyze the results of using a particular welding process and/or consumable for a specific welding application. Furthermore, a need exists for a tool that will enable a user to analyze the economic costs and/or benefits of using a specific welding application and/or consumable.

SUMMARY OF THE INVENTION

A system and method for evaluating the use of a welding process for welding a weld joint. The method comprises providing a user with requests for data to enable a processor-based system to establish various attributes of welding a specific weld joint using a specific welding process. The various attributes may include the cost of welding the weld joint using the welding process. The various attributes may include the cycle time for welding the weld joint using the welding process. The system comprises a program stored in a tangible medium. The program is adapted to direct the system to request data from a user and process the requested data received from the user to enable a processor-based system to establish various attributes of welding a specific weld joint using a specific welding process.

BRIEF DESCRIPTION OF THE DRAWINGS

The foregoing and other advantages and features of the invention will become apparent upon reading the following detailed description and upon reference to the drawings in which:

FIG. 3 illustrates a second worksheet of the workbook, in accordance with an exemplary embodiment of the present technique;

FIG. 4 illustrates a third worksheet of the workbook, in accordance with an exemplary embodiment of the present technique;

FIG. 5 illustrates a fourth worksheet of the workbook, in accordance with an exemplary embodiment of the present technique;

FIG. 8 illustrates a seventh worksheet of the workbook, in accordance with an exemplary embodiment of the present technique;

FIG. 9 illustrates a database worksheet of the workbook, in accordance with an exemplary embodiment of the present technique;

FIG. 10 illustrates a database worksheet of the workbook, in accordance with an exemplary embodiment of the present technique;

FIG. 11 illustrates a summary of the results of the data processing performed by the workbook, in accordance with an exemplary embodiment of the present technique;

FIG. 13 illustrates a welding procedure detailed report produced by the workbook, in accordance with an exemplary embodiment of the present technique;

FIG. 14 illustrates a welding procedure summary report produced by the workbook, in accordance with an exemplary embodiment of the present technique;

FIG. 15 illustrates a welding procedure comparison report produced by the workbook, in accordance with an exemplary embodiment of the present technique;

FIG. 20 illustrates a welding procedure process improvement checklist produced by the workbook from the data inputted into the welding procedure process improvement map, in accordance with an exemplary embodiment of the present technique.

DETAILED DESCRIPTION OF SPECIFIC EMBODIMENTS

Figure 1:
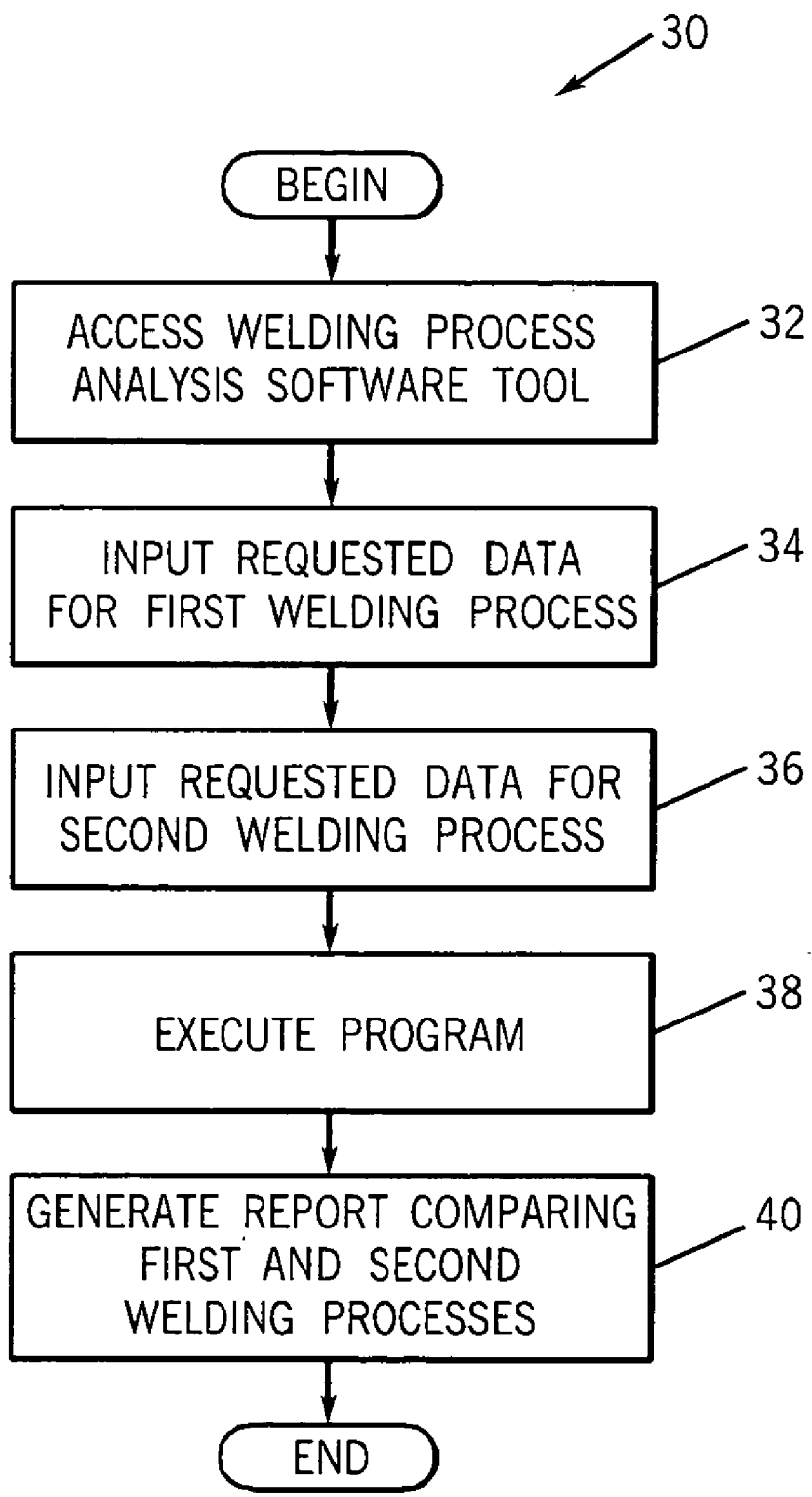
FIG. 1 is a block diagram representing a process to facilitate the analysis of the applicability of using a specific welding process for a specific welding operation, in accordance with an exemplary embodiment of the present technique.

Referring generally to FIG. 1, a process to facilitate the selection of a welding process for a specific welding operation is illustrated, represented generally by reference numeral 30. In the illustrated process, a welding process analysis tool is provided to enable a user to input and process welding process data, as represented by block 32. The welding process analysis tool processes the data and provides an output that facilitates a comparison of various welding processes. The welding process analysis tool utilizes a program to process the welding process data and produce an output for analysis. The program may be stored in a tangible medium, such as a computer disc, a hard drive, a network, etc. The program may be executed using a desktop computer, a notebook computer or any of a number of different electronic devices.

In the illustrated process, the analytical tool prompts a user to input data corresponding to a first welding process, as represented by block 34. The first welding process may or may not be a welding process currently in use. In the illustrated embodiment, a user is prompted to input data for a second welding process, as represented generally by block 36. A user initiates the computer program, as represented by block 38, to process the data in accordance with instructions within the program. In the illustrated embodiment, the welding process analysis tool generates a report that provides welding process data to facilitate a comparison of the first and second welding processes, as represented by block 40. The welding process data may be technical data, economic data or some other data of interest.

Figure 2:
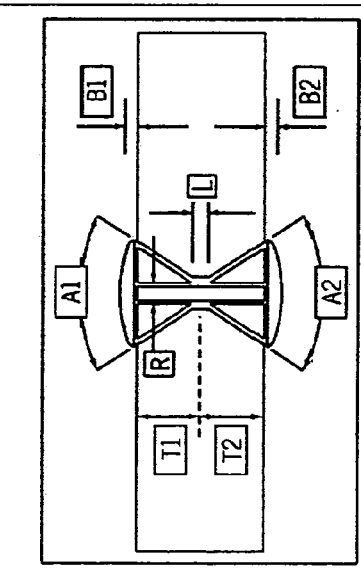
FIG. 2 illustrates a first worksheet of a spreadsheet workbook, in accordance with an exemplary embodiment of the present technique.

Referring generally to FIG. 2, an embodiment of a welding process analysis tool that utilizes a spreadsheet workbook is illustrated, as represented generally by reference numeral 42. In the illustrated embodiment, the spreadsheet workbook 42 comprises a plurality of spreadsheet worksheets. The worksheets comprise a plurality of cells. The cells may be adapted to enable data to be inputted into the workbook 42 or to display information to a user. The cells may also be programmed to perform various data processing functions. In addition, the cells may be linked to a cell within a worksheet, or to a cell in another worksheet. The spreadsheet workbook 42 is adapted to store welding process related data, such as recommended operating parameters, e.g. voltage, current, and wire speed, for welding with a specific electrode. The spreadsheet workbook 42 also is provided with programming instructions to enable the workbook 42 to process the data entered by a user and/or the welding process related data stored in the workbook 42.

The illustrated spreadsheet workbook 42 is adapted to be displayed on a computer monitor. However, the spreadsheet workbook 42 may be adapted to be displayed on displays of other types of electronic devices, such as personal digital assistants. In the illustrated embodiment, the spreadsheet worksheets are accessed by activating a corresponding tab 44. The illustrated spreadsheet workbook 42 is adapted to enable a user to select the language and units of measure used in the spreadsheet workbook 42. In the illustrated embodiment, English has been selected as the language and Imperial/English units have been selected as the units of measure. However, other languages and units may be selected, such as French and metric units, respectively.

In FIG. 2, a first worksheet 46 that is adapted to elicit specific weld joint data is illustrated. In this embodiment, the worksheet 46 is adapted to enable a user to select a specific type of weld joint for analysis from among a plurality of available weld joint types. The weld joint worksheet 46 also displays requested weld joint data corresponding to the selected weld joint type and enables a user to enter the requested weld joint data into cells of the spreadsheet workbook 42. In the illustrated embodiment, worksheet 46 has a pull-down menu 48 that enables a user to select the type of weld joint for analysis. In FIG. 2, the user has selected a "double V groove" type weld joint for analysis. In the illustrated embodiment, the workbook 42 produces an image 50 of the selected weld joint type. The illustrated worksheet 46 also comprises a weld joint data entry portion 52 to enable dimensional data for the specific weld joint to be entered into cells of the workbook 42. In the illustrated embodiment, the image 50 and weld joint data entry portion 52 are adapted to cooperate to illicit the desired information. Each of the requested dimensions of the weld joint is marked on image 50 with an identifier. A cell in the weld joint data entry portion is provided with a corresponding identifier to encourage a user to provide the requested dimensional data. Generally, the data is adapted to enable the workbook 42 to calculate the cross-sectional area of the weld joint. In this embodiment, the workbook 42 has a virtual button 54 that when operated directs the workbook 42 to calculate the cross-sectional area of the weld joint and the weight per unit length of the weld based on the data entered in the weld joint data portion 52. The results are displayed in cells in a calculated values portion 56 of the worksheet 42. In addition, the illustrated embodiment of worksheet 46 also has a virtual button 58 to enable a user to reset the dimensional values entered in weld joint data portion 52.

Figure 3:
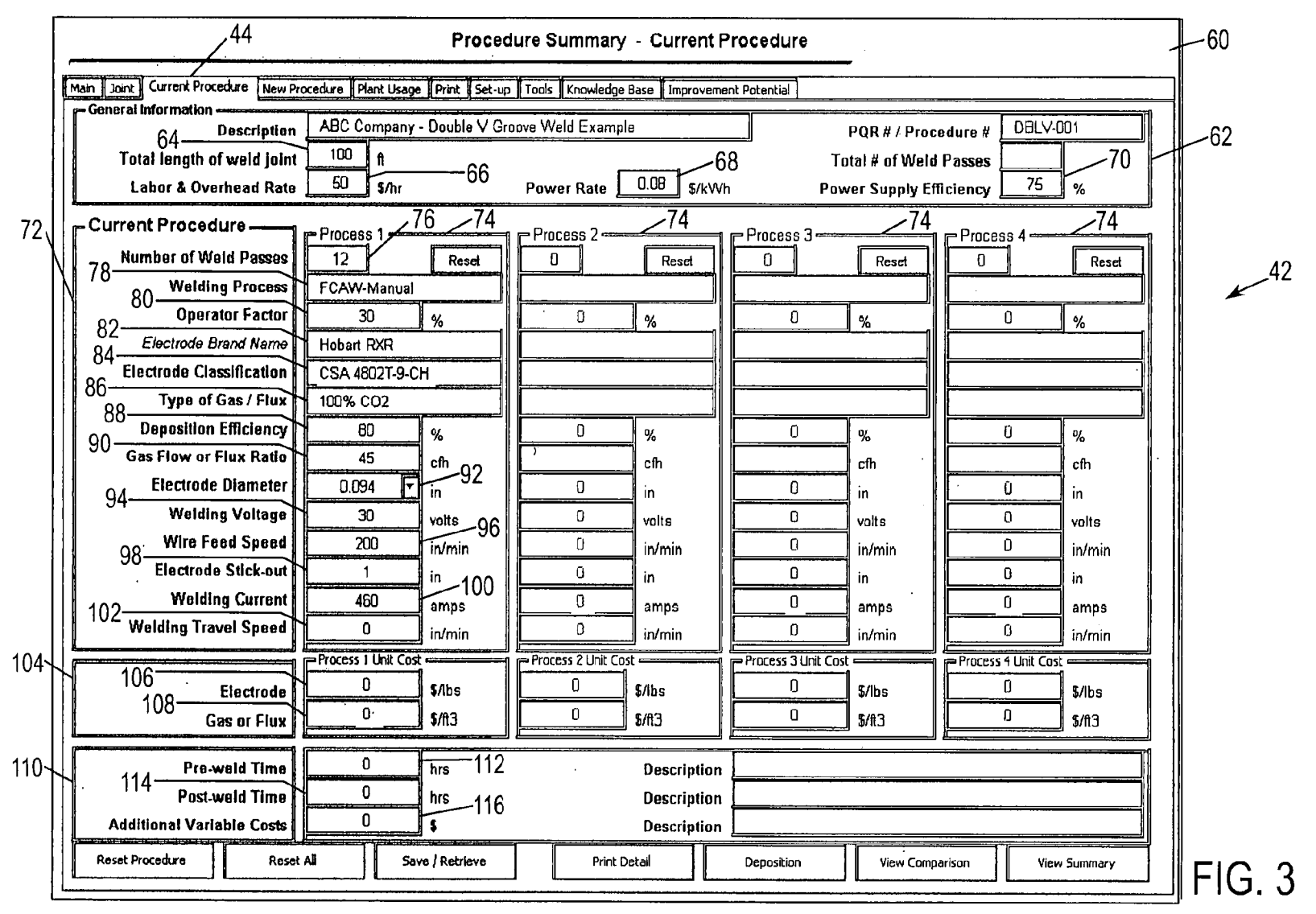

Referring generally to FIG. 3, a second welding procedure worksheet 60 adapted to enable a user to input data for a plurality of welding procedures into the workbook 42 is illustrated. The first welding procedure may be a currently-used welding procedure or the first of several potential welding procedures selected for analysis. In the illustrated embodiment, worksheet 60 comprises a general information portion 62. The general information portion comprises a cell 64 to enable the total length of a weld joint to be entered into the spreadsheet. The general information portion also comprises a labor/overhead rate cell 66 that enables a user to input the cost of labor and/or overhead in monetary units per hour. As mentioned above, the illustrated spreadsheet enables a user to select from a number of monetary units, such as U.S. dollars, Canadian dollars, French francs, etc. In this embodiment, the general information portion 62 also comprises a cell 68 to enable the cost of power to be entered in monetary units, such as dollars, per kilowatt-hour. In this embodiment, a cell 70 is provided to enable a user to input the power supply efficiency in percent.

Worksheet 60 also comprises a technical data portion 72. This portion of worksheet 60 enables a user to input technical data for the first welding procedure into the workbook 42. In the illustrated embodiment, the technical data portion 72 is adapted to enable data for a welding procedure that uses several different welding processes or characteristics to be entered into the worksheet 60. The technical data for the first welding procedure is entered in a series of cells 74 for each welding process used in the first welding procedure. In the illustrated embodiment, each series has a cell 76 to enable the number of welding passes that are made with each welding process to be entered. In addition, a pull-down menu 78 is provided to enable a user to select the specific welding process used in the welding process. A cell 80 also is provided to enable a user to input the operator factor in percent for each welding process in the first welding procedure. A cell 82 is provided to enable the electrode brand name to be identified for each welding process in the first welding procedure. An electrode classification cell 84 is provided to enable the electrode classification to be selected for each welding process in the first welding procedure. In addition, a cell 86 is provided to enable a user to input the type of gas, gas mixture, or flux used in each welding process of the first welding procedure. A cells 88 also is provided to enable a user to input the deposition efficiency. A cells 90 also is provided to enable a user to input the gas flow rate or flux ratio. A pull-down menu 92 is provided to enable a user to input the diameter of the electrode used in each process in the first welding procedure. A cell 94 is provided to enable a user to input the welding voltage used for each welding process in the first welding procedure. In addition, a cell 96 is provided to enable a user to input the wire feed speed if an electrode wire is used in the first welding process. A cell 98 is provided to enable a user to input the electrode stick-out associated with the electrode used. A cell 100 is provided to enable a user to input the current used in each welding process of the first welding procedure. Finally, a cell 102 is provided to enable a user to input the travel speed of a welder.

As discussed above, welding related data is stored in the workbook 42. In the illustrated embodiment, data for a plurality of welding processes and for a plurality of electrodes has been entered and stored in the spreadsheet workbook 42. The workbook 42 is adapted to retrieve this data when process or electrode specific data is entered into cells in the workbook 42. For example, the workbook 42 is adapted with recommended operating parameters for each of a plurality of electrodes. When the electrode data is provided in cell 82, the type of gas data is provided in cell 86, and the electrode diameter is provided in cell 92, the workbook 42 compares the data with the recommended operating parameter data stored within the workbook 42 and fills in cells 94, 96, 98, and 100 with the welding voltage, wire feed speed, electrode stick-out, and welding current, respectively. However, if the actual or desired data is different than the recommended data, new data may be provided in the cells.

In addition, worksheet 60 also comprises a consumable cost portion 104 for each of the welding processes. The consumable cost portion 104 comprises a first cell 106 to enable a user to input the cost per pound of the electrode. The illustrated consumable cost portion 104 also comprises a cell 108 to enable a user to input the cost of gas or flux in dollars per cubic foot or dollars per pound, respectively. Worksheet 60 also comprises a miscellaneous portion 110. The miscellaneous portion 110 comprises a cell 112 to enable a user to input the time required for per-weld procedures prior to commencing the first welding process. In addition, a cell 114 is provided to enable a user to input the time required for post weld procedures. In addition, a cell 116 is provided to enable the user to input additional variable costs in dollars.

Figure 4:
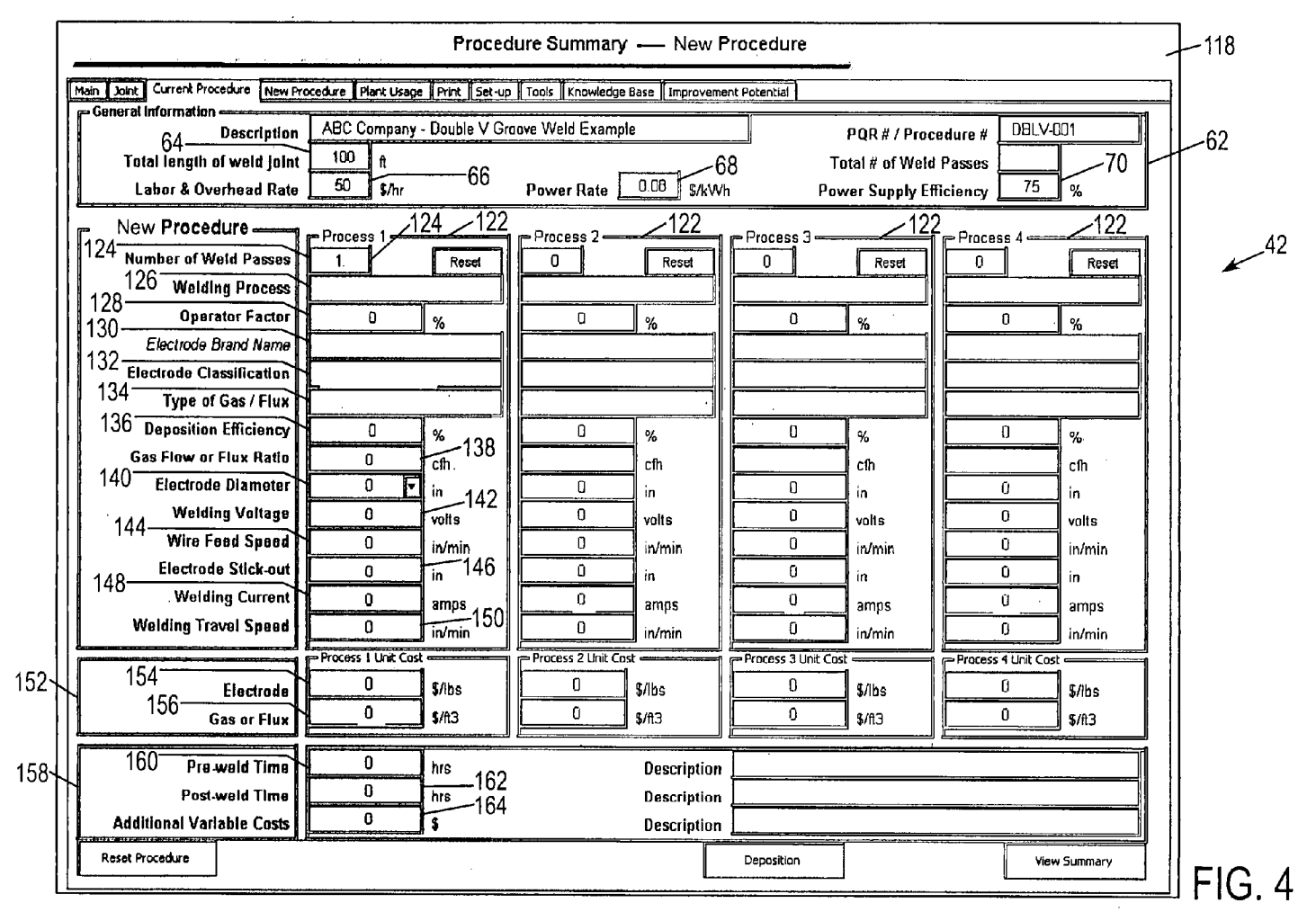

Referring generally to FIG. 4, a third worksheet 118 for entering a new, or second, welding procedure is illustrated. In this embodiment, worksheet 118 comprises a new or first welding procedure technical data portion 120. The illustrated embodiment enables technical data for a plurality of different welding processes to be entered. In the illustrated embodiment, portion 120 comprises a plurality of data sets 122 corresponding to a second welding procedure. In this embodiment, a cell 124 is provided in each set 120 to enable a user to input the number of weld passes associated with a first welding process of the second welding procedure. In addition, a cell 126 is provided to enable a user to select the welding process used in each welding process. In addition, a cell 128 is provided in each data set 122 to enable a user to input the operator factor in percent associated with each welding process of the second welding procedure. In addition, a cell 130 is provided to enable a user to select the brand name of the electrode used in the first welding process. Also, a cell 132 is provided to enable the user to select the classification of the electrode used in the first welding process. A cell 134 is provided to enable a user to input the type of gas or flux used in the each welding process. A cell 136 is provided to enable the user to input the deposition efficiency of the welding process in percent. In addition, a cell 138 is provided to enable the user to input the gas flow or flux ratio in cubic feet per hour or as a ratio of flux consumed per pound of wire consumed, respectively. A cell 140 is provided to enable the user to input the electrode diameter in inches. A cell 142 is provided to enable the user to input the welding voltage in volts. In addition, a cell 144 is provided to enable the user to input the wire feed speed in inches per minute if an electrode wire is used. A cell 146 is provided to enable a user to input the electrode stick out in inches. In addition, a cell 148 is provided to enable a user to input the welding current in amps. Also, a cell 150 is provided to enable a user to input the welding travel speed in inches per minute.

Worksheet 118 also comprises a consumable cost portion 152 for each of the second welding processes. A cell 154 is provided to enable a user to input the cost of the electrode in dollars per pound. A cell 156 is provided to enable a user to input the cost of gas or flux in dollars per cubic foot. A miscellaneous portion 158 is provided to enable a user to input additional time or cost data. A cell 160 is provided to enable a user to input pre-weld time in hours. In addition, a cell 162 is provided to enable a user to input post-weld time associated with the second welding process. A cell 164 is provided to enable a user to input additional variable costs associated with using the second welding procedure.

Figure 5:
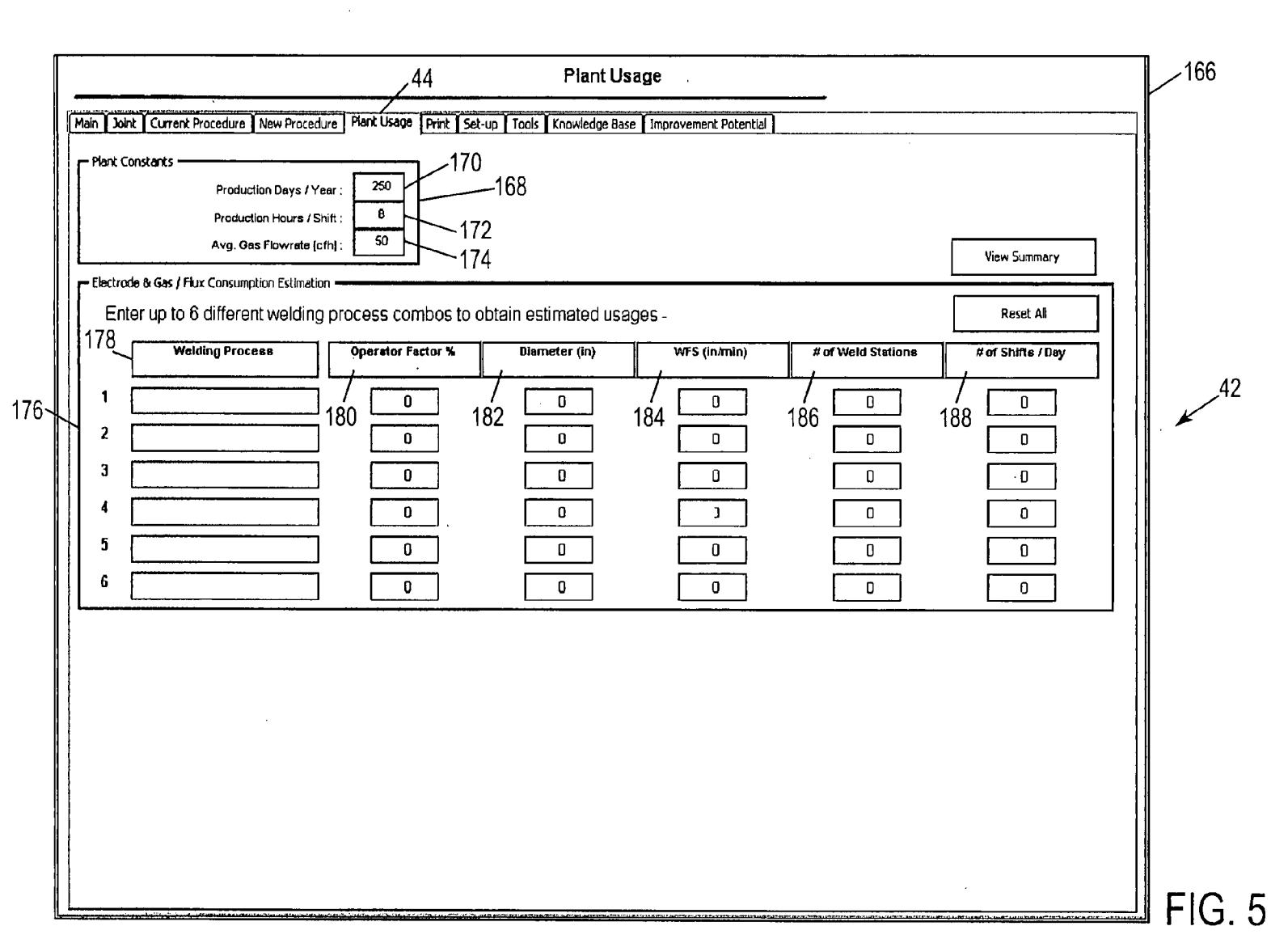

Referring generally to FIG. 5, a fourth worksheet 166 is provided to enable a user to input plant usage data for the facility in which the welding procedures are to be performed. The information obtained enables the workbook 42 to extrapolate data. In the illustrated embodiment, worksheet 166 comprises a plant constant portion 168. A cell 170 is provided in the plant constant portion 168 to enable a user to input the number of production days per year. Another cell 172 is provided to enable a user to input the number of production hours per shift. A cell 174 also is provided to enable a user to input the average gas flow rate in cubic feet per hour.

Worksheet 166 also comprises a consumable consumption estimation portion 176. Consumable consumption estimation portion 176 comprises a welding process portion 178 which enables a user to input consumable information of each of a plurality of welding processes. Consumable consumption estimation portion 176 also comprises an operator factor portion 180, which enables a user to input the operator factor in percent for each of the plurality of welding processes. In addition, consumable consumption estimation portion 176 also comprises a portion 182 to enable a user to input the diameter of the electrode used for each of the plurality of welding processes. A plurality of cells 184 also are provided to enable a user to input the wire feed speed in inches per minute for each of the plurality of welding processes. In addition, a plurality of cells 186 are provided to enable a user to input the number of welding stations using each of the plurality of welding processes. In addition, a plurality of cells 188 are provided to enable the user to input the number of shifts per day using each of the welding processes.

Figure 6:
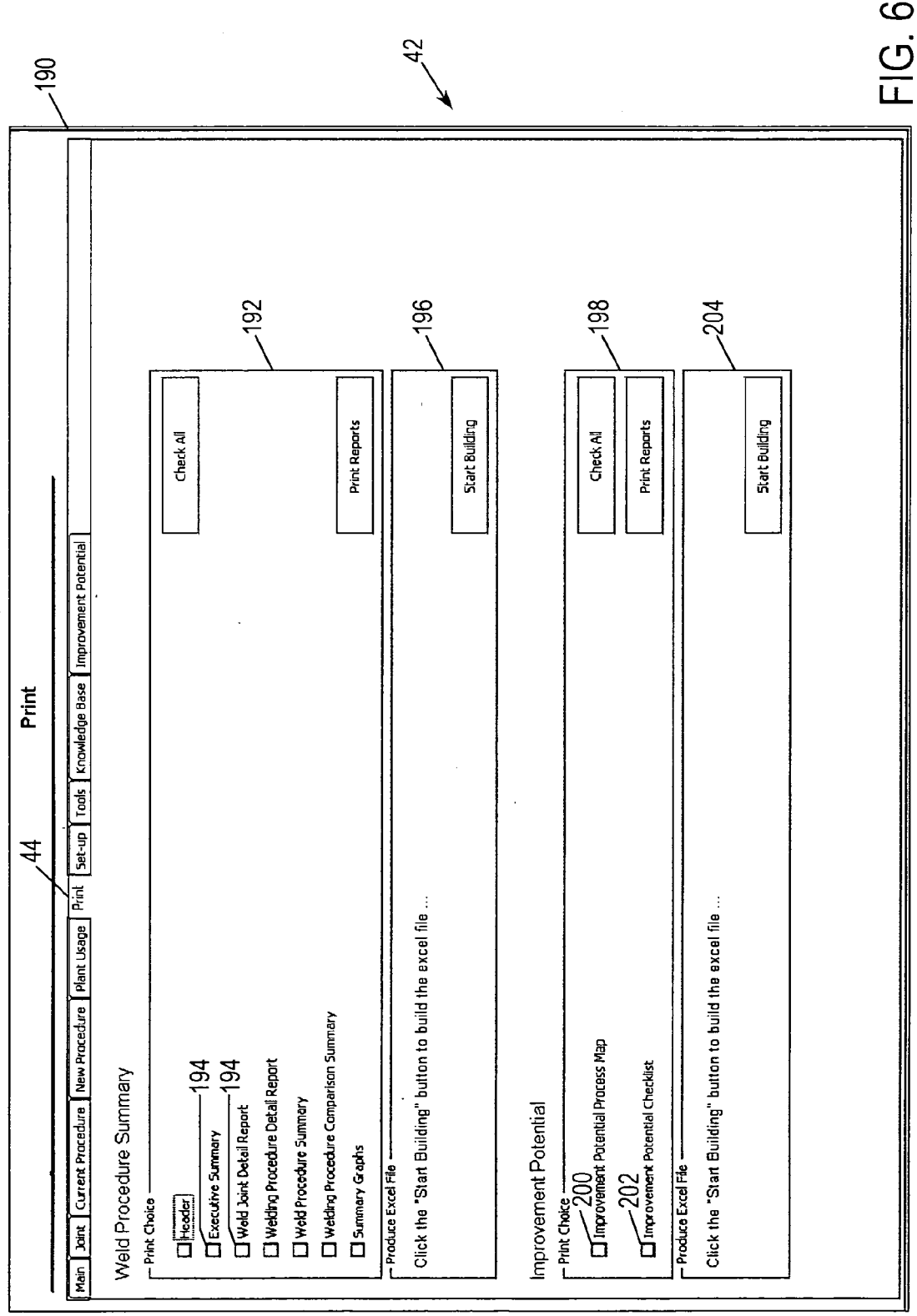
FIG. 6 illustrates a fifth worksheet of the workbook, in accordance with an exemplary embodiment of the present technique.

Referring generally to FIG. 6, a fifth worksheet 190 is illustrated. Worksheet 190 comprises a print choice portion 192 to enable a user to select desired portions of a welding report produced by the analysis tool for printing. Each of the portions is represented by a selection box 194, which may be checked by using a mouse to place a curser over the box 194 and clicking the right mouse button. Worksheet 190 also comprises a virtual button 196 to enable a user to activate the program to process the data entered in the previous worksheets and place the results in a worksheet file.

Worksheet 190 also comprises an improvement potential print portion 198. As will be discussed later, the workbook 42 enables a user to produce an improvement potential process map and/or an improvement potential checklist. Improvement potential portion 198 comprises a selection box 200 to enable a user to select the printing of an improvement potential process map. A second box 202 is provided to enable a user to select the printing of an improvement potential checklist. Worksheet 190 also comprises a virtual button 204 to enable a user to direct the workbook 42 to build a worksheet file for the improvement potential portion.

Figure 7:
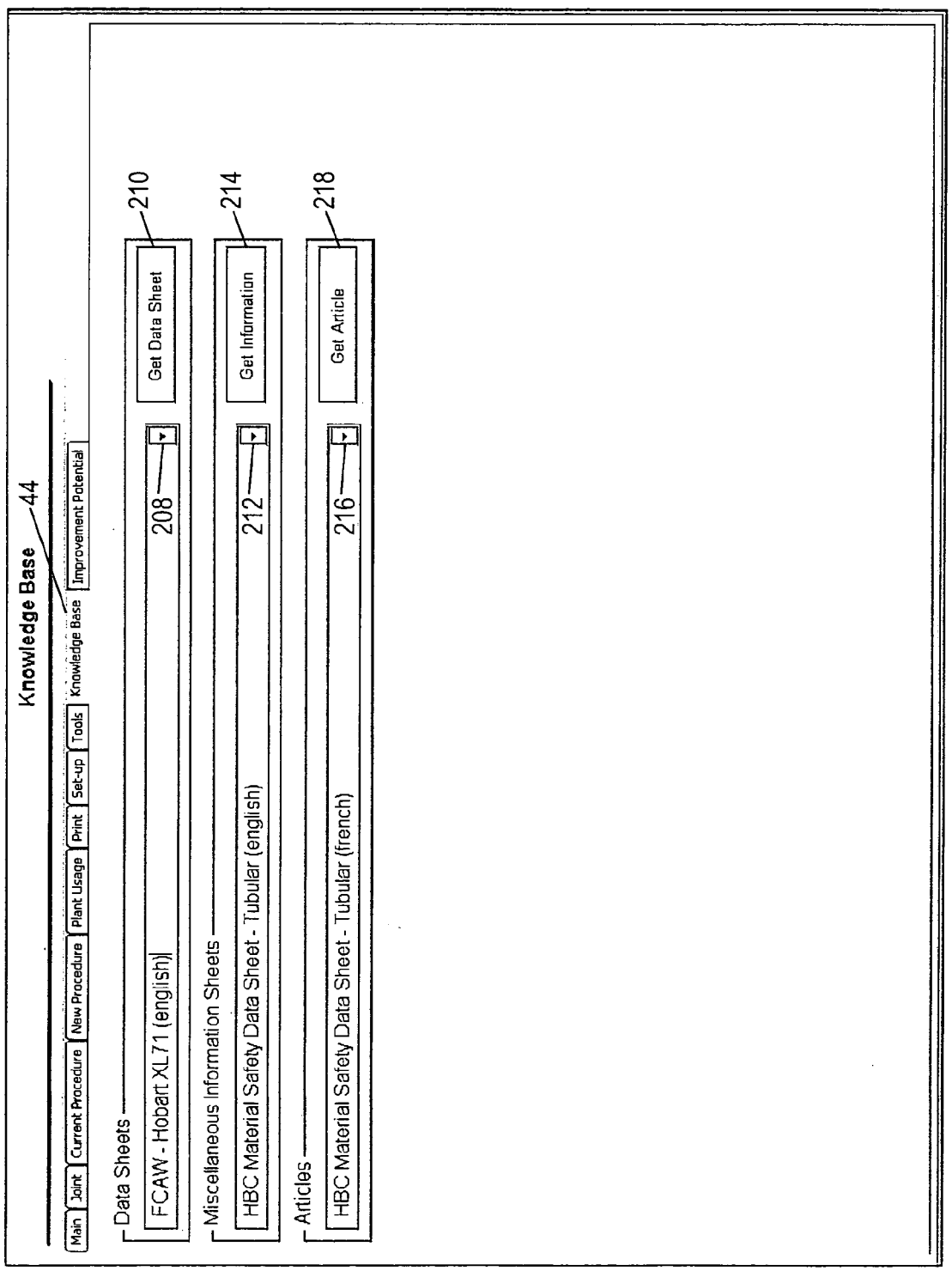
FIG. 7 illustrates a sixth worksheet of the workbook, in accordance with an exemplary embodiment of the present technique.

Referring generally to FIG. 7, a sixth worksheet 206 is illustrated. Knowledge base worksheet 206 enables a user to access various information stored in databases of the workbook 42. Worksheet 206 comprises a data sheet pull-down menu 208. Data sheet pull-down menu 208 enables a user to select a data sheet from a list of specific welding-related data sheets, such as a datasheet for a specific welding electrode or welding process. A virtual button 210 is provided that directs the workbook 42 to retrieve the data sheet selected with pull-down menu 208. In addition, worksheet 206 comprises a second pull-down menu 212 to enable a user to retrieve miscellaneous information sheets, such as material safety data sheets for specific welding materials. The information sheet may be obtained by selecting the desired information using the pull-down menu and operating a second virtual button 214. The illustrated embodiment of worksheet 206 also comprises a third pull-down menu 216 to enable a user to review various articles. In the illustrated embodiment, the requested article selected using the pull-down menu 216 and operating a virtual button 218 to direct the tool to retrieve the article.

Figure 8:
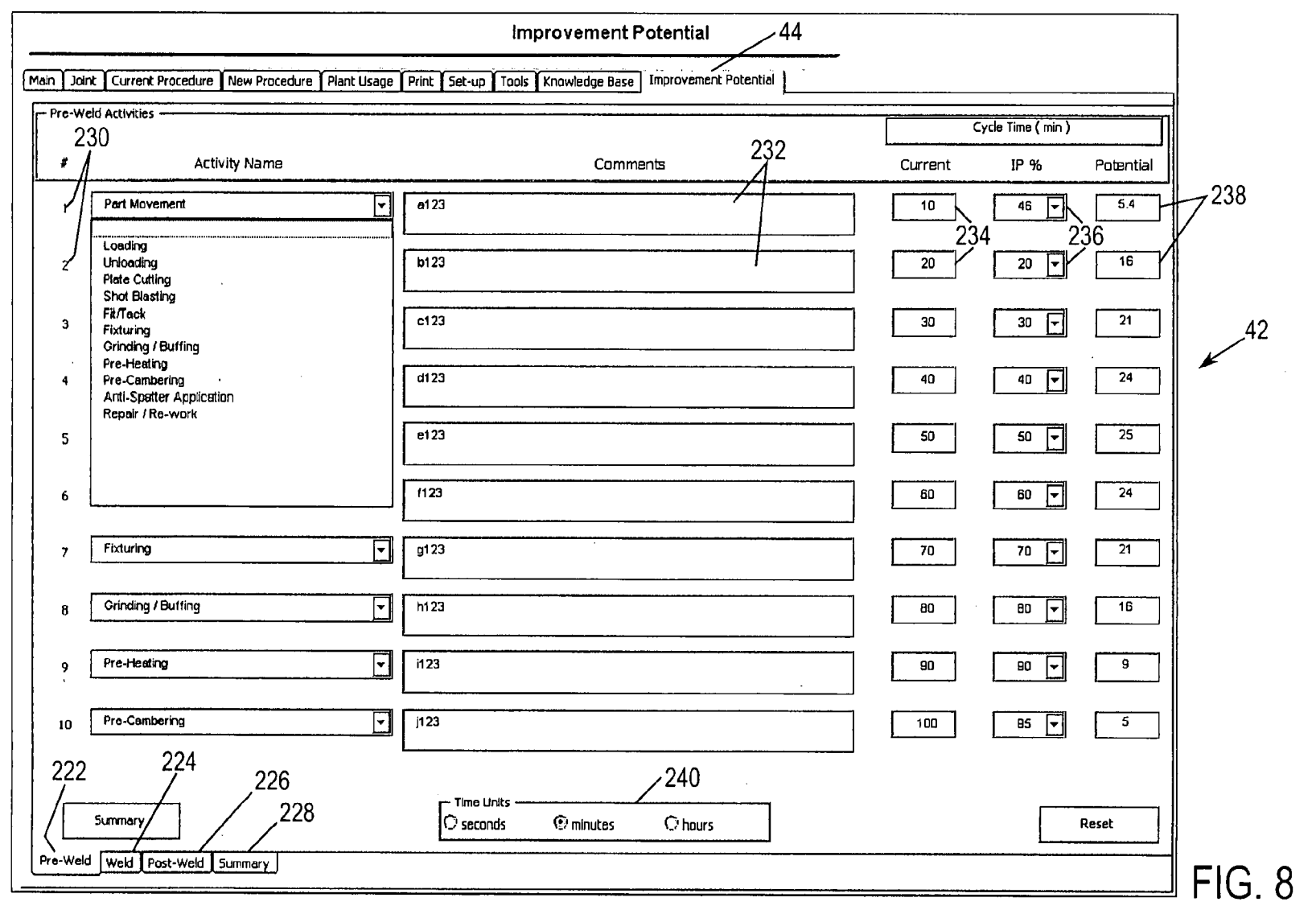

Referring generally to FIG. 8, workbook 42 also comprises an improvement potential worksheet 220. The improvement potential worksheet 220 enables a user to identify those portions of a manufacturing process that may be improved upon. In this embodiment, improvement potential worksheet 220 comprises four sub-worksheets. Illustrated is the pre-weld activity worksheet 222. In addition, there is a weld activity worksheet 224, a post-weld worksheet 226, and a summary worksheet 228. Pre-weld activity worksheet 222 enables a user to input those activities that are performed prior to welding with a first or current welding procedure. Worksheet 222 comprises a plurality of pull-down menus 230 to enable a user to select various pre-weld activities, such as part movement, plate cutting, grinding, pre-heating, etc., that are performed as part of the welding procedure. Worksheet 222 also comprises a plurality of comment boxes 232 to enable a user to input personal comments which will be incorporated into the improvement potential map or checklist. In addition, worksheet 222 comprises a cycle time box 234 for each of the plurality of pre-weld activities associated with the first or current welding procedure. When activated using the virtual button 204 illustrated in FIG. 6, the workbook will identify a potential improvement in the cycle time for each of the various activities depending upon the second welding procedure selected. The potential for improvement is provided in a plurality of boxes 2–6 corresponding to each of the pre-weld activities. In addition, a plurality of output boxes 238 are provided to indicate the actual improvement in time for each of the pre-weld activities based on the improvement potential percentage. In addition, a time unit box 240 is provided to enable a user to select the time unit associated with each of the pre-weld activities, e.g., seconds, minutes, or hours.

Referring generally to FIG. 9, a portion of a data sheet stored within the software analysis tool is illustrated. In this embodiment, technical data associated with a particular welding process is illustrated. A particular welding process may be performed with many operating variables, such as the electrode diameter, the wire feed speed, the electrode stick-out, the amperage, etc. For a given operational variable, there may be recommended values for the other operating parameters. For example, there may be a preferred range of wire feed speeds associated with performing a specific welding process using a wire electrode of a specific diameter. In addition, for each wire feed speed, there may be a preferred electrode stick-out or amperage value. In the illustrated embodiment, datasheet 240 comprises a series of columns of recommended associated operating parameters. A first column 242 identifies a particular welding process and shield gas combination. Datasheet 240 also comprises a second column 244 that identifies the specific welding process, such as FCAW. A third column 246 identifies an electrode diameter in imperial/english units. Similarly, a fourth column 248 identifies an electrode diameter in metric units. A fifth column 250 identifies a wire-feed speed in imperial/english units. Similarly, the metric equivalent of the wire feed speed provided in the fifth column 250 is provided in a sixth column 255. In addition, a sixth column 254 provides an electrode stick out in imperial/english units. A seventh column 256 provides the metric equivalent of the electrode stick out provided in the seventh column 254. A ninth column provides a welding amperage. Finally, a tenth column 260 identifies the shield gas.

Referring generally to FIG. 10, an embodiment of a second datasheet 262 is illustrated. In this embodiment, recommended operating parameters are provided for a plurality of welding consumables, such as electrode wire. Data sheet 262 comprises a first column 264 which identifies a consumable and a shield gas combination. Data sheet 262 also comprises a second column 266 that identifies a specific consumable name. A third column 268 identifies the diameter in imperial/english units for a specific consumable. Similarly, a fourth column 270 provides the diameter of the electrode in metric units. Another column 272 identifies the recommended voltage for welding with a specific consumable having the specific electrode diameter. Similarly, another column 274 is provided which provides the recommended wire feed speed in imperial/english units for use with the specific electrode having the specific diameter. An additional column 276 is provided to identify a recommended electrode stick out for the specific consumable having the specific diameter. Similarly, a column 278 is provided to identify the recommended wire feed speed in metric units. In addition, a column 280 is provided to identify the electrode stick out in metric units. Finally, a column 282 is provided to identify the recommended welding current corresponding to the specific electrode wire having the specific diameter.

As discussed above, as data is provided in worksheets 60 and 118, the workbook 42 uses a process of elimination and lookup functions to identify recommended operating parameter data stored in datasheets 240 and 262 and provides that data to cells in worksheets 60 and 118. However, the cells may be overwritten with actual operating parameter data if that differs from the recommended values.

Referring generally to FIGS. 11–20, as discussed above, the workbook 42 is operable to process the data entered into the worksheets and produce a report based on the data provided. In the illustrated embodiment, a summary report 284 generated by the workbook 42 is illustrated. In this embodiment, the workbook 42 is operable to produce a plurality of comparisons between the current, or first, welding procedure and a second, or new, welding procedure. In this embodiment, the workbook 42 determines the total amount of metal that would be deposited using the two welding procedures and establishes the net difference. The value of the net difference in total metal deposited is inserted into a designated portion 286 of the summary report. In addition, the workbook 42 is operable to establish the cycle time savings that may result from utilizing the second welding procedure, as opposed to the first welding procedure. The result is provided by the workbook 42 into a specified portion 288 of the summary report. In addition, the workbook 42 is operable to establish the heat input to the metal produced by the first welding procedure and the second welding procedure. The workbook 42 also is operable to establish the heat input difference between the two procedures and insert the value of the difference into a corresponding portion 290 of the summary report. Finally, in this embodiment, the workbook 42 is operable to identify the total process cost associated with the first welding procedure and the second welding procedure. In addition, the workbook 42 is operable to establish the total cost difference between the two procedures and to provide the result in a corresponding portion 292 of the summary report 284.

Figure 12:
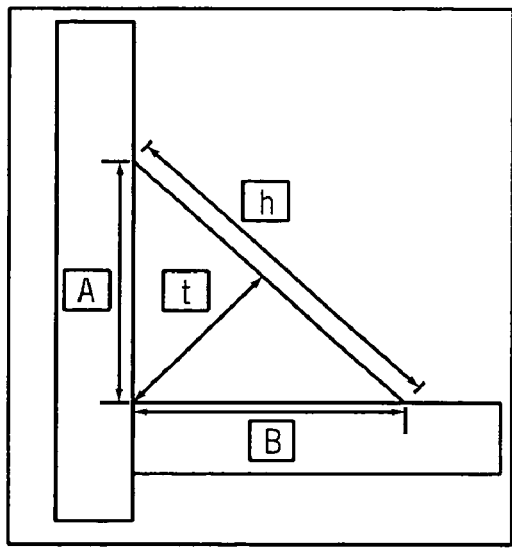
FIG. 12 illustrates a summary of weld joint data produced by the workbook, in accordance with an exemplary embodiment of the present technique.

Referring generally to FIG. 12, the workbook 42 also generates a weld joint detail report 294. In this embodiment, the weld joint detail report 294 includes a graphic image 296 of the weld joint. The workbook 42 also is operable to establish dimensional parameters of a plurality of weld joints. In this embodiment, weld joint detail report 294 includes calculated dimensional data 298 based on weld joint parameters entered by the user into worksheet 46, such as the cross-sectional area of the weld and the throat distance through a fillet weld joint.

Referring generally to FIG. 13, the workbook 42 also generates a welding procedure detail report 300. In this embodiment, the first or current welding procedure information entered in worksheet 60 is reproduced in the welding procedure detail report 300. In addition, theoretical metal deposition rate information 302 also is provided for each process used in the welding procedure. In addition, the second welding procedure information entered using worksheet 118 illustrated in FIG. 4 also is provided in welding procedure detail report 300. In addition, theoretical metal deposition rate information 304 is provided for each process used in the second or new welding procedure.

Referring generally to FIG. 14, the workbook 42 also is operable to produce a weld procedure summary 306. In this embodiment, the workbook 42 is operable to establish the cross sectional area of a weld joint. This information may be used to establish the amount of weld metal required for the weld joint. This embodiment, weld procedure summary 306 includes a portion 308 that provides the amount of weld metal deposited by the first or current procedure and the amount of metal required by the weld joint. In addition, the workbook 42 is operable to establish the total cycle time required for the welding procedure. In this embodiment, the cycle time required for the first or current welding procedure is provided in a second portion 310 of weld procedure summary 306. In addition, as discussed above, the workbook 42 is operable to establish the amount of heat inputted into a workpiece using the first or current welding procedure. This value is provided in a third portion 312 of weld procedure summary 306. In addition, the workbook 42 is operable to establish amount of electrode consumed, shielding gas consumed, and power consumed. This information is provided in a fourth portion 314 of welding procedure summary 306. The workbook 42 also is operable to establish the cost of the first or current welding procedure. The workbook 42 is operable to establish the labor cost associated with pre-weld labor, welding labor, and post-weld labor. In addition, the welding procedure tool is operable to establish the cost of the electrode wire, shielding gas, and electric power associated with the first or current welding procedure, as well as any additional variable expenses. In this embodiment, the welding procedure cost information is provided in a fifth portion 316. Finally, the sum of the various costs associated with the first or current welding procedure is provided in a sixth portion 320 of welding procedure summary 306.

Referring generally to FIG. 15, the welding procedure tool is operable to establish various parameters associated with each welding process and produce the parameters in a welding procedure comparison summary 334. In the illustrated embodiment, the welding procedure comparison summary 334 comprises a first comparison 336 and a second comparison 338 between the first welding procedure and the second welding process. Both comparisons provide a side-by-side comparison of various parameters for each of the first and second welding processes. The first comparison 336 provides data for each process for each weld joint. The second comparison 338 provides data for each process per each 100 lbs of metal deposited or per multiple iterations of the weld joint.

In the illustrated embodiment, the welding procedure comparison summary 334 provides material data and cycle time data. For example, the first comparison 336 provides the amount of metal deposited for each weld joint using the first and second process. In addition, the first comparison 336 provides the amount of excess material deposited for each weld joint, if any, as a result of using the first or second processes. In addition, the first comparison 336 provides the amount of time required prior to welding, during welding, and after welding for each weld joint using the first and second processes. The second comparison 338 provides the amount of time required prior to welding, during welding, and after welding for each 100 lbs. of material deposited using the first and second processes or per multiple iterations of the weld joint. In the illustrated embodiment, the first comparison 336 and second comparison 338 also provide the difference in time for performing the welding procedure using the first and second processes.

The illustrated welding procedure comparison summary 334 also provides consumable consumption data and heat input data for the first and second processes. The first comparison 336 provides the amount of electrode material, the amount of shielding gas, and the amount of power consumed for each weld using each of the first and second processes. The second comparison 338 provides the amount of electrode material, the amount of shielding gas, and the amount of power consumed for each weld using each of the first and second processes.

The illustrated welding procedure comparison summary 334 also provides cost and savings data for the first and second welding processes. The first and second comparisons provide the pre-weld labor costs, welding labor costs, post-weld labor costs, electrode costs, shielding gas costs, and additional variable costs associated with performing the welding procedure using the first and second welding processes. The first and second comparisons also compare the cost data for performing the welding procedure using the first and second processes and provide a cost difference/savings value between using the first and second welding process to perform the welding procedure.

Figure 16:
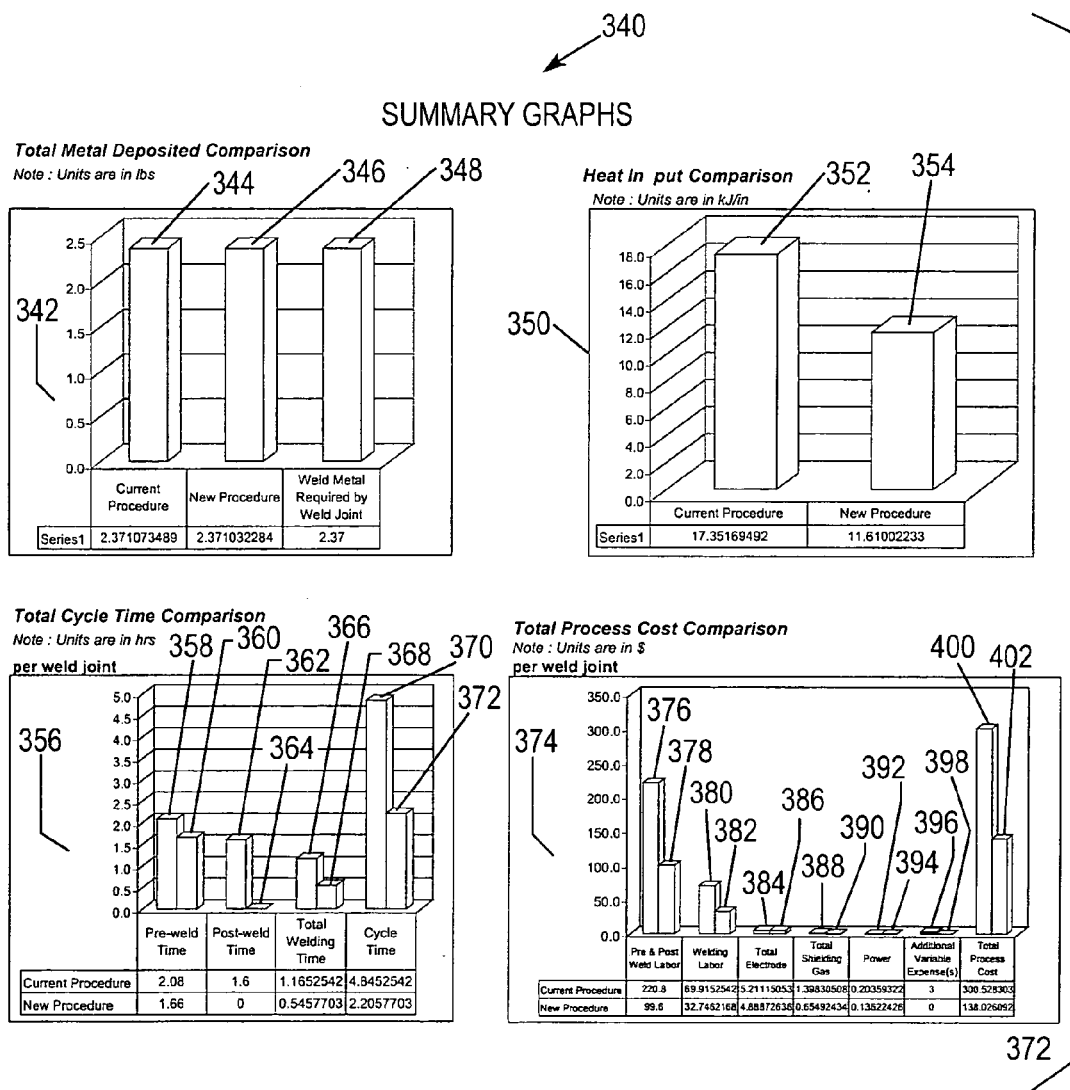
FIG. 16 illustrates graphs of welding procedure data produced by the workbook, in accordance with an exemplary embodiment of the present technique.

Referring generally to FIG. 16, the workbook 42 also is adapted to produce a series 340 of bar graphs summarizing the various parameters provided in the welding procedure comparison summary 334. However, the workbook 42 is operable to produce other types of graphs, as well as graphs of other parameters associated with performing the welding procedure using the first and second welding processes. In the illustrated embodiment, the workbook 42 produces a first bar graph 342 that enables a visual comparison of the total metal deposited during the welding procedure using the first and second welding processes. The first bar graph 342 includes a first bar 344 that represents the amount of metal deposited during the welding procedure using the first welding process. The first bar graph 342 also includes a second bar 346 that represents the amount of metal deposited during the welding procedure using the second welding process. Finally, the first bar graph 342 includes a third bar 348 that represents the amount of metal required to perform the welding procedure.

In the illustrated embodiment, the workbook 42 also produces a second bar graph 350 that enables a visual comparison of the heat inputted into the workpiece during the welding procedure using the first and second welding processes. The second bar graph 350 includes a first bar 352 that represents the amount of heat input during the welding procedure using the first welding process. The second bar graph 350 also includes a second bar 354 that represents the amount of heat input during the welding procedure using the second welding process.

In addition, the workbook 42 also is operable to produce a third bar graph 356 that enables a visual comparison of the time required to perform the welding procedure using the first and second welding processes. The third bar graph 356 includes a first bar 358 that represents the pre-weld time using the first welding process. The third bar graph 356 includes a second bar 360 that represents the pre-weld time using the second welding process. The third bar graph 356 also includes a third bar 362 and fourth bar 364 that represent the post-weld time using the first and second welding processes, respectively. The third bar graph 356 also includes a fifth bar 366 and sixth bar 368 that represent the total welding time using the first and second welding processes, respectively. Finally, the third bar graph 356 includes a seventh bar 370 and eighth bar 372 that represent the total cycle time to perform the welding procedure using the first and second welding procedures, respectively.

Figure 17:
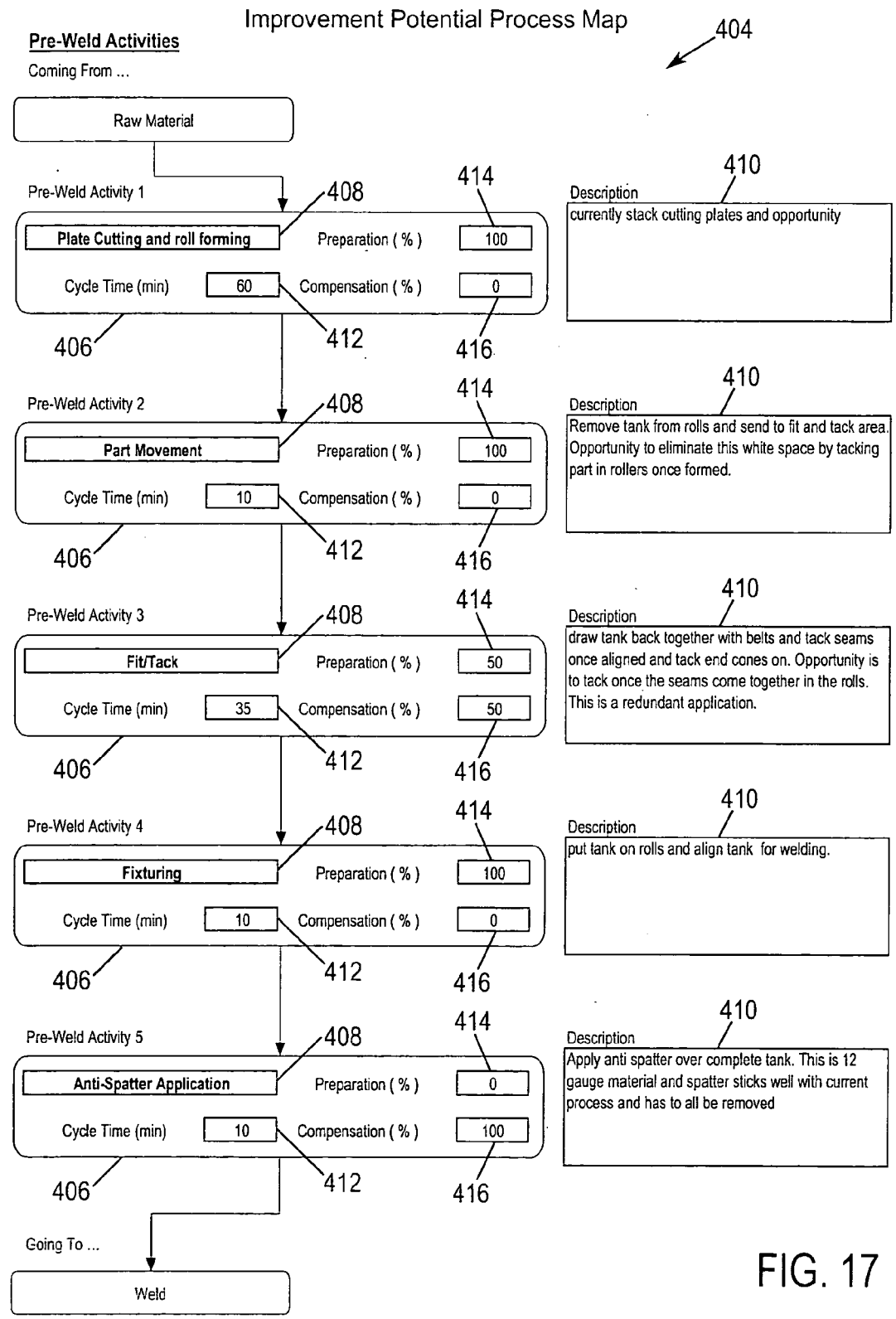
FIG. 17 illustrates a first portion of a welding procedure process improvement map produced by the workbook, in accordance with an exemplary embodiment of the present technique.

Referring generally to FIG. 17, the workbook 42 also is operable to produce a process map to identify and illustrate potential improvements in a manufacturing process, including pre-weld activities, weld activities, and post-weld activities. A variety of pre-weld activities may be performed prior to welding. In the illustrated embodiment, a variety of pre-weld activities that may be performed prior to welding are represented by a series of blocks 406. Each block has a title box 408 to identify each of the possible pre-weld activities. A larger text box 410 is provided to enable a user to describe the pre-weld activity in more detail and to describe potential improvements. The blocks 406 also comprise a text box 412 to enable a user to input the time required to perform the pre-weld activity currently. One block 414 is provided to enable a user to input the percentage of the time that is required to perform the pre-weld activity that is preparation and that cannot be improved upon and a second block 416 is provided to enable a user to input the percentage of the time to perform the pre-weld activity that can be eliminated. The reduction in time may be related to the use of a new welding process, a step that may be eliminated or improved, etc. Alternatively, the blocks 406 may be represented by a series of rows of blocks having pull-down windows to enable each of the rows to correspond to any of the variety of pre-weld activities.

Figure 18:
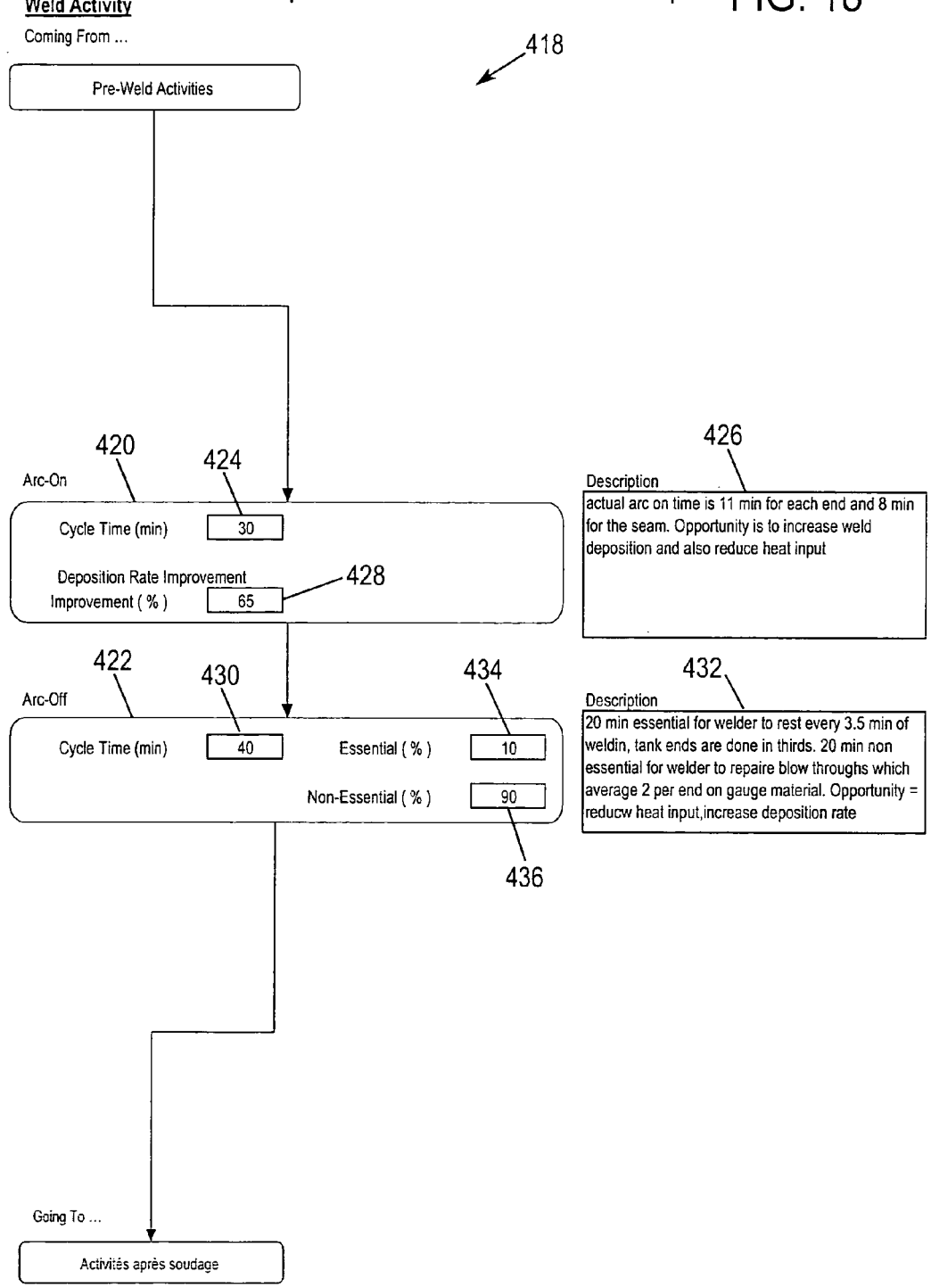
FIG. 18 illustrates a second portion of a welding procedure process improvement map produced by the workbook, in accordance with an exemplary embodiment of the present technique.

Referring generally to FIG. 18, the improvement process map 404 also enables a user to identify and illustrate potential improvements to the welding operation itself. In the illustrated embodiment, a first block 420 is provided to represent that portion of the welding process when actual welding is being performed, i.e., when an arc is being produced. A second block 422 represents that portion of the welding process when welding is not being performed, i.e., no arc is being produced. The first block 422 comprises a text box 424 to enable a user to provide the cycle time required to perform the welding operation using the first welding procedure. An additional text box 426 is provided to enable a user to describe the welding activity in more detail and to describe potential improvements to the welding activity. An additional block 428 is provided to display the potential for decreasing the cycle time, in percentage, by improving the deposition rate using the second welding process. This value is calculated by the spreadsheet.

The second block 422 comprises a text box 430 providing the time that the arc is off during the welding procedure. The second block 422 also includes a text box 432 to enable a user to describe potential improvements to this portion of the welding process. For example, the use of a new welding process may reduce the time required to repair a poor weld, or reduce the heat input to the weld, which in turn may reduce the time required to enable a metal to cool down before returning to welding. A first block 434 is provided to identify that percentage of the arc-off time provided in block 430 that cannot be improved upon. A second block 436 is provided to identify that percentage of the arc-off time provided in block 430 that can be improved/eliminated.

Figure 19:
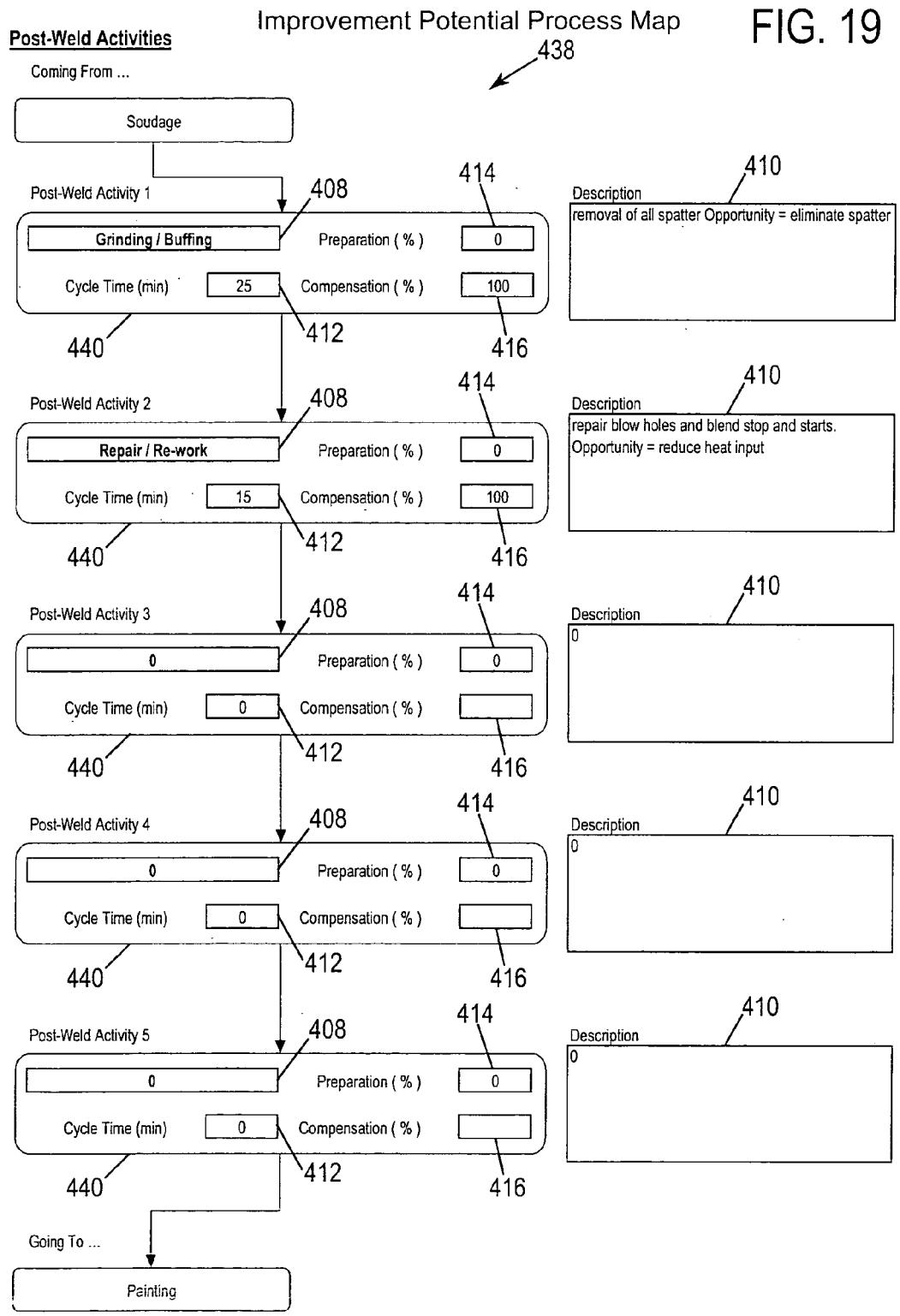
FIG. 19 illustrates a third portion of a welding procedure process improvement map produced by the workbook, in accordance with an exemplary embodiment of the present technique.

Referring generally to FIG. 19, the improvement process map 404 also identifies and illustrates potential improvements to the post-welding operation. In the illustrated embodiment, a variety of post-welding activities currently performed subsequent to performing the welding operation using the first welding process are represented by a series of blocks 440. Each block 440 has a title box 408 corresponding to a specific post-weld activity. A larger text box 410 is provided to enable a user to describe the post-weld activity in more detail and to describe potential improvements. The blocks 440 also comprise a text box 412 to enable a user to input the time currently required to perform the post-weld activity. A first block 414 is provided to enable a user to input that percentage of the time required to perform the post-weld activity that cannot be reduced. A second block 416 is provided to enable a user to input that percentage of the time required to perform the post-weld activity that can be reduced or eliminated.

Referring generally to FIG. 20, the workbook 42 is operable to convert the information provided above into a checklist 442 to illustrate the effect of the potential improvements. In the illustrated embodiment, the improvement potential checklist 442 comprises a first column 444 that lists the title of each of the various activities listed in the improvement potential process map, including the pre-weld activities, the welding activities, and the post-weld activities. The illustrated improvement potential checklist 442 also comprises a second column that identifies the current time required to perform the various activities. In addition, the workbook 42 is operable to add the time required for each activity and provide the total time required to perform the welding procedure in a box 448 at the bottom of the second column 446. The improvement potential checklist 442 also comprises a third column 450 that provides the potential improvement to the activity by using the second welding process in percent of time. A fourth column 452 provides the potential improvement to the activity in actual time units. The workbook 42 also is operable to add the potential improvement time for each activity and provide the total time that may be saved by performing the welding procedure using the second welding process in a box 454 at the bottom of the fourth column 452. Finally, a fifth column 456 is provided that lists the various text boxes 410 completed using the improvement potential process map and corresponding to each of the activities listed in the first column 444.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of evaluating a welding process, comprising:
providing a system to enable a user to select a plurality of welding processes for comparison;
requesting welding process data and dimensional data from a user to enable the system to establish a cross-sectional area of the weld joint and produce a comparison between using each of the plurality of welding processes to weld a weld joint based partially on the established cross-sectional area of the weld joint;
processing the requested data to produce the comparison between using each of the plurality of welding processes to weld the weld joint; and providing the comparison and/or the cross-sectional area of the weld joint for a user.

2. The method as recited in claim 1, wherein requesting weld processing data from a user comprises requesting the user to select a weld joint type corresponding to the weld joint.

3. The method as recited in claim 1, wherein processing the requested data to produce a comparison comprises producing a cost comparison between welding the weld joint using a first welding process and welding the weld joint using a second welding process.

4. The method as recited in claim 1, wherein the system comprises welding data stored in a database, further wherein the system compares a user's response to at least one of a series of data requests to the welding data stored in the database to provide the user with a recommended response to at least one of the series of data requests.

5. The method as recited in claim 1, wherein processing the requested data comprises producing a comparison between a first amount of filler material deposited using the first welding process to weld the weld joint and a second amount of filler metal deposited using a second welding processes to weld the weld joint.

6. The method as recited in claim 1, wherein processing the requested data comprises producing a comparison between a first cycle time for welding the weld joint using a first welding process and a second cycle time for welding the weld joint using a second welding process.

7. The method as recited in claim 6, wherein requesting data from a user comprises requesting pre-weld activity time and post-weld activity time associated with the first welding process, and the comparison between the first cycle time and second cycle time includes a reduction in at least one of the pre-weld activity time and post-weld activity time by using the second welding process.

8. The method as recited in claim 1, wherein processing the requested data comprises producing a first heat input to the weld joint using the first welding process and a second heat input to the weld joint using a second welding process.

9. A method of using a processor-based system to establish a cost associated with welding a weld joint, comprising:
enabling the processor-based system to provide a user with a request for a weld joint type corresponding to the weld joint;
enabling the processor-based system to provide the user with a request for dimensional data for the weld joint based on the weld joint type provided by the user;
enabling the processor-based device to establish the cross-sectional area of the weld joint based on the dimensional data provided by the user:
enabling the processor-based system to establish the cost of welding electrode material used to weld the weld joint based on the dimensional data provided by the user and the established cross-sectional area of the weld joint; and enable the processor-based system to communicate the cost and/or the cross-sectional area of the weld joint for a user.

10. The method as recited in claim 9, wherein the requested dimensional data for the weld joint is weld joint length.

11. The method as recited in claim 9, wherein providing the processor-based device with requested dimensional data comprises entering data into a plurality of data cells, each data cell being labeled with a reference to a specific dimension of the weld joint.

12. The method as recited in claim 9, further comprising:
enabling the processor-based system to provide the user with a request for electrode cost rate data; and
enabling the processor-based system to establish the cost of welding electrode material used to weld the weld joint based on the electrode cost rate data provided by the user.

13. The method as recited in claim 9, further comprising:
enabling the processor-based system to provide the user with a request for labor cost rate data; and
enabling the processor-based system to establish the cost of labor used to weld the weld joint based on the labor cost rate data provided by the user.

14. The method as recited in claim 9, further comprising:
enabling the processor-based system to provide the user with a request for power cost rate data; and
enabling the processor-based system to establish the cost of power used to weld the weld joint based on the power cost rate data provided by the user.

15. A program stored on a computer readable medium, comprising:
programming instructions operable to direct a processor-based device to provide a request for weld joint dimensional data to a user to enable the processor-based device to establish the volume of the specific weld joint;
programming instructions operable to direct the processor-based device to provide a request for welding process data to a user;
programming instructions operable to direct the processor-based device to establish a cost of welding the weld joint based on the weld joint dimensional data and the welding process data provided by the user; and programming instructions operable to direct the processor-based device to communicate the cost and/or the volume of the specific weld joint for a user.

16. The program as recited in claim 15, comprising:
programming instructions operable to enable the processor-based device to display the cost of welding the weld joint on the processor-based device.

17. The program as recited in claim 15, wherein the request for dimensional data comprises a spreadsheet comprising a plurality of cells, each cell being labeled with a reference to a specific dimension of the weld joint.

18. The program as recited in claim 15, wherein the program enables the processor-based device to establish the cost of welding the weld joint based on the established volume of the specific weld joint.

19. A method of analyzing a welding process, comprising:
enabling a processor-based device to request welding process data and dimensional data from a user to enable the processor-based device to establish energy inputted into a work piece during a welding operation;
enabling the processor-based device to establish the volume of the specific weld joint based on the requested dimensional data;
operating the processor-based device to execute a program adapted to establish the energy input into the weld joint based on the requested data received from the user and the established volume of the specific weld; and
enabling the processor-based device to communicate the energy input and/or the volume of the specific weld joint for a user.

20. The method as recited in claim 19, wherein the requested data comprises welding voltage.

21. The method as recited in claim 19, wherein the requested data comprises welding current.

22. The method as recited in claim 19, wherein the requested data comprises the number of weld passes.

23. The method as recited in claim 19, wherein the requested data comprises welding travel speed.

24. A method of utilizing a processor-based device to establish cross-sectional area of a weld joint, comprising:
enabling a user to input a weld joint type corresponding to the weld joint to the processor-based device;
providing a user with a request for dimensional data for the weld joint based on the weld joint type, the request comprises providing an image of the selected weld joint type on the visual display, the image having a identifier corresponding to a dimension of the weld joint;
processing the requested dimensional data to establish the cost of welding electrode material used to weld the weld joint; and communicating the cost and/or cross-sectional area of a weld joint for a user.

25. The method as recited in claim 24, wherein enabling a user to provide the dimensional data comprises providing a data entry portion corresponding to the dimension on the visual display and providing a corresponding identifier to the identifier on the image.

26. The method as recited in claim 25, wherein the data entry portion comprises a plurality of cells, each cell having an identifier disposed proximate thereto and corresponding to a specific dimension of the weld joint.

27. The method as recited in claim 24, wherein the dimensional data comprises weld joint length and operating the processor-based device to execute a program also comprises establishing the volume of the weld joint based on the cross-sectional area of the weld joint and the weld joint length.

28. The method as recited in claim 24, wherein enabling comprises providing a menu of weld joint types on the visual display.

29. A method of using a processor-based device to establish an amount of welding material deposited during a welding operation, comprising:
providing a user with a request for electrode data;
providing the user with a request for shield gas data;
providing the user with a request for weld joint dimensional data;
providing a program to enable the processor-based device to establish a cross-sectional area of the weld joint and the amount of welding material deposited during the welding operation based on the electrode data, shield gas data, and weld joint dimensional data provided by the user; and providing the processor-based device with means for communicating the cross-sectional area of the weld joint and/or the amount of welding material deposited during the welding operation for a user.

30. The method as recited in claim 29, wherein the request for electrode data comprises a request for the type of electrode used.

31. The method as recited in claim 29, wherein the request for electrode data comprises a request for the diameter of electrode used.

32. The method as recited in claim 29, wherein the request for electrode data comprises a request for the wire feed speed.

33. The method as recited in claim 29, wherein the request for shield gas data comprises a request for the shield gas used.

34. A method of quantifying potential improvements to a manufacturing process, comprising:
operating a processor-based device to display a plurality of activities associated with a manufacturing process;

providing a duration for performing each of the plurality of activities associated with the manufacturing process including the duration of a first cycle time for welding a weld joint using a first welding process and a second cycle time for welding a weld joint using a second welding process;

providing a potential decrease in the duration for performing at least one of the plurality of activities associated with the manufacturing process. wherein the potential decrease includes a reduction in at least one of the pre-weld activity time and post-weld activity time by using the second welding process;

operating the processor-based system to establish a total potential decrease in duration for performing the manufacturing process based on the potential decreases in the duration for performing at least one of the plurality of activities of the manufacturing process; and receiving the total potential decrease in duration for performing the manufacturing process from processor-based system.

35. The method as recited in claim 34, wherein the display of a plurality of activities comprises a welding operation performed using a different welding process than a current welding process associated with the manufacturing process.

36. The method as recited in claim 35, wherein inputting potential decreases in the duration for performing each of the activities of the current manufacturing process comprises operating the system to establish a decrease in duration for performing the welding operation using the different welding process compared to the current welding process.

37. A computer program, comprising:

programming instructions stored on a computer readable medium, wherein the programming instructions enable a user to operate a processor-based device to develop a map of activities associated with a manufacturing process including a first cycle time for a welding operation using a first welding process and a second cycle time for a welding operation using a second welding process and to enable the user to input potential decreases in the duration of performing at least one activity associated with the manufacturing process wherein the potential decreases include a reduction in at least one of the pre-weld activity time and post-weld activity time by using the second welding process, and the programming instructions enable a user to evaluate the potential decreases.

* * * * *